Aug. 30, 1966 R. M. MEADE ETAL 3,270,324

MEANS OF ADDRESS DISTRIBUTION

Filed Jan. 7, 1963 11 Sheets-Sheet 3

DISTRIBUTED DECODING ALPHAMERIC TABLE

OVERLAPPED DECODING ALPHAMERIC TABLE

Aug. 30, 1966 R. M. MEADE ETAL 3,270,324

MEANS OF ADDRESS DISTRIBUTION

Filed Jan. 7, 1963 11 Sheets-Sheet 5

Aug. 30, 1966 R. M. MEADE ETAL 3,270,324

MEANS OF ADDRESS DISTRIBUTION

Filed Jan. 7, 1963 11 Sheets-Sheet 7

United States Patent Office 3,270,324

Patented August 30, 1966

3,270,324
MEANS OF ADDRESS DISTRIBUTION

Robert M. Meade, Wassaic, and Kenneth W. Borror, Poughkeepsie, N.Y., assignors to International Business Machines Corporation, New York, N.Y., a corporation of New York

Filed Jan. 7, 1963, Ser. No. 249,761
11 Claims. (Cl. 340—172.5)

This invention relates to data processing memory systems, and more particularly to distributing addresses indicative of data locations amongst a plurality of memories.

TABLE OF CONTENTS

| | Column |
|---|---|
| Prior Art | 1 |
| Objects, Features, Advantages | 2 |
| Figures | 3 |
| Data Word Format (FIG. 16, Sheet 11) | 4 |
| Memory Word Arrangement (FIG. 17, Sheet 11) | 4 |
| Table Lookup in Distributed Mode (FIG. 1, Sheet 1; FIG. 3, Sheet 3) | 5 |
| MEMORY Structure (FIG. 5, Sheet 4) | 8 |
| Table Lookup in Overlapped Mode (FIG. 2, Sheet 2; FIG. 4, Sheet 3) | 9 |
| TABLE BASE ADDRESS SHIFTER Structure (FIG. 6, Sheet 4) | 10 |
| MEMORY SELECTOR Structure (FIG. 7, Sheet 5) | 11 |
| Miscellaneous Structure (FIG. 1, Sheet 1) | 12 |
| Details of Gist of Invention (FIG. 1, Sheet 1; FIG. 2, Sheet 2; FIGS. 3 and 4, Sheet 3) | 13 |
| Introduction to Further Examples | 15 |
| Function of "a" and "b" in Distributed Mode (FIG. 8, Sheet 6; FIG. 9, Sheet 8) | 15 |
| Function of "a" and "b" in Overlapped Mode (FIG. 10, Sheet 7; FIG. 11, Sheet 8) | 17 |
| Introduction to "Count" Examples | 18 |
| Count Operation in Distributed Mode (FIG. 12, Sheet 9; FIG. 13, Sheet 11) | 19 |
| Count Operation in Overlapped Mode (FIG. 14, Sheet 10; FIG. 15, Sheet 11) | 20 |

*Prior art*

In the data processing art, the trend has been to increase the speed of operation of data processing machines. As is well known in the art, the speed at which data transferral and computations can be made is sometimes limited by the technology of the components parts of the data processing apparatus. This is true in the case of ultra-speed modern computers wherein computations can be effected at a speed which is somewhat greater than the speeds at which data manifestations can be stored in and retrieved from memory units.

The prior art has partially alleviated this problem by providing a plurality of memory units, each of which requires more time for a cycle than does the associated main processing unit. For instance, if the processing unit is four times as fast as each of the memory units associated therewith, then four memories may be provided to faciltate increasing the speed at which the computer can operate. This recent advancement in the art provides a series of complete memory units, with sequential addresses distributed among the units: thus, memory unit number 1 contains addresses 1, 5, 9, 13, etc., memory unit number 2 contains addresses 2, 6, 10, 14, and so forth. This means that during operations wherein the computer calls for data located in a series of sequential addresses, the memory units can operate in overlapped fashion to provide data to the computer four times as fast as any one memory could do so. When operating in overlapped fashion, each memory unit is operating at a different point in its cycle with respect to the other memory units, and the units take turns in receiving data from, or transferring data to, the remainder of the computer. However, this form of completely overlapped operation is limited to use in data processing operations wherein the program calls for data from successive ones of a plurality of addresses located in sequence. Whenever successive data is sent to or retrieved from the same unit, the computer will have to wait for the memory unit.

*Objects, features, advantages*

A primary object of this invention is to extend the high speed operational capabilities of a computer.

This invention is predicated on the concept that since the cost of memory units increases more than proportionally with the increases in speeds obtainable, it is cheaper to use a plurality of slow memory units than it is to use a single memory unit which is capable of operating at speeds in the same order of magnitude as the remainder of the computer.

In accordance with the present invention, a plurality of memory units are provided for operation in a distributed fashion, wherein each memory is capable of storing or retrieving data from any address which the computer may be programmed to use. In other words, each memory storage location address may be simultaneously used to designate a data storage location in each of a plurality of memory units.

Utilization of this invention is, of course, achieved at the expense of memory storage locations: that is, if four low speed memories are utilized as a single memory, only one-fourth as much data can be stored therein. Therefore, situations may occur when the memory capacity of a computer becomes exhausted due to the fact that like locations in all four memories are allocated to the same address.

Another and more specific object of the present invention is to provide an improved high speed memory addressing system wherein a plurality of memory units may be utilized either in distributed fashion or in a nondistributed fashion, alternatively.

A further object is to provide a universal memory addressing apparatus capable of addressing a plurality of memories which are utilized in the regular way (each unit being unrelated to the others), or are operated in the overlapped mode known in the prior art (with adjacent sequential addresses in different units), or in a distributed fashion in accordance with the present invention (with each address in every unit), selectively.

A further object is to provide such a memory system capable of switching between modes of operation by means of simple program instructions, without requiring that the addresses used within the program be specifically arranged to account for the different memory units which the address may specify in the various modes of operation.

In accordance with more specific aspects of the present invention, means are provided to manipulate addresses in such a fashion that each stored unit of data, or potentially storable unit of data, may be represented by a single unique address designation, which address designation is automatically converted into a proper address to suit the mode of operation of the memory system. More particularly, in the example of the invention disclosed herein, addressing which is fully distributed may be achieved by shifting a basic address (similar to a table-base address used in pure table lookup operations), thereby giving it a lower-ordered significance, adding the shifted address to an input address representative of a particular unit of data dividing the total address into two components and re-shifting one of the components an amount equal to the original shifting, but in the opposite direction, so as to end up with a total address manifestation proper for distributed operation. In overlapped operation, the shifting operations are eliminated. Further, several addresses may be combined so as to provide for table lookup type of computations whether in the distributed or the overlapped mode. Additionally, distributed or overlapped operation may be used where the addresses are related, but may not contain the same data.

The invention provides for super-speed lower capacity memory systems which are convertible to medium speed full capacity memory systems without the need for rearranging in advance the addresses used to locate particular memory locations. The invention is compatible with combinational operations and all forms of table lookup operations, as well as any other type of memory operation which has heretofore been obtainable.

The foregoing and other objects, features and advantages of the invention will be apparent from the following more particular description of a preferred embodiment thereof as explained with reference to several exemplary operations and as illustrated in the accompanying drawings.

Figures 13, 15, 16, 17:
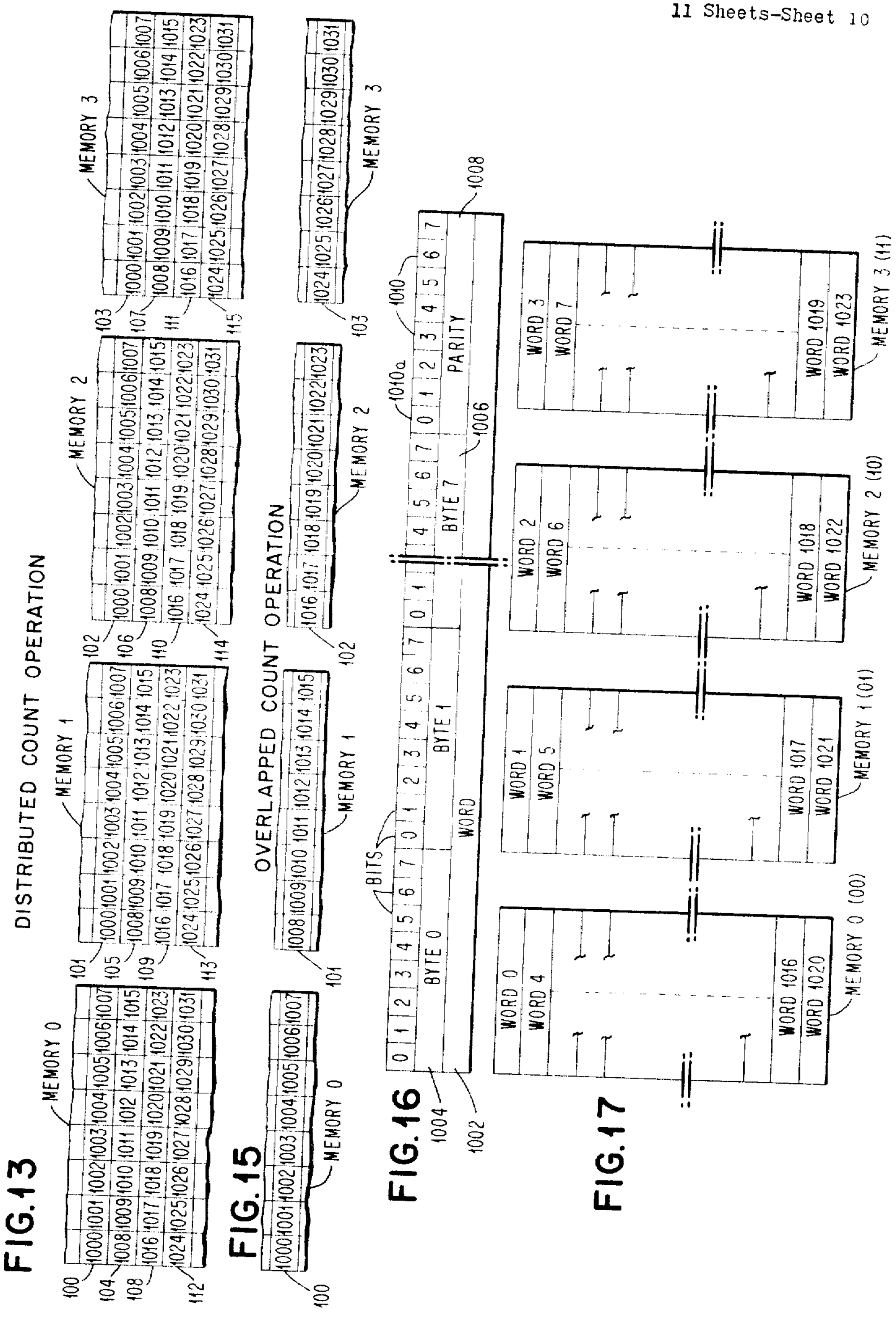
FIG. 13 is a simplified and partially broken away diagram of the memory apparatus shown in FIGS. 3, 4 and 5 with notation applied to illustrate a distributed count operation in accordance with FIG. 12.
FIG. 15 is a simplified and partially broken away diagram of the memory apparatus shown in FIGS. 3, 4 and 5 with notation applied to illustrate an overlapped count operation in accordance with FIG. 14.
FIG. 16 is a schematicized diagram illustrating a word format suitable for use with the apparatus of FIGS. 1–15.
FIG. 17 is a simple schematicized diagram illustrating the basic layout of data words within a plurality of memory units in accordance with the preferred embodiment of the invention disclosed in FIGS. 1–16.

*Data word format—FIG. 16, Sheet 11*

In order to more fully understand the apparatus of a preferred embodiment of the present invention, a brief discussion of the word format and other characteristics of computer hardware will first be given.

A data word in a computer is a collection of signals which together have a unique significance in the operation of the computer. The significance may be letters, numbers or words which have meaning in human language, or may be symbolic representations of machine operations that may be performed, or symbolic representations of machine operations which have been performed. In the present embodiment, the use of the binary number system is contemplated, and for simplicity, it is assumed that the presence of a signal represents a binary ONE and the absence of a signal represents a binary ZERO. The smallest unit of a data word is a bit, each bit capable of assuming a state indicating either a binary ONE or a state indicating a binary ZERO. Thus, in a plurality of current carrying conductors, or other "signal lines," each may respectively correspond to a unique one of the data bits in a data word. The presence of a signal on a line signifies that the corresponding data bit is a binary ONE, and the absence of a signal signifies that the corresponding data bit is a binary ZERO, during any instant of time under consideration.

Referring now to FIG. 16 (sheet 11), the format of a data word (1002) is seen to comprise eight data bytes which are herein named BYTE 0 (1004) through BYTE 7 (1006), as well as a PARITY byte (1008) which contains a parity bit (1010) respectively corresponding to each of the data bytes BYTE 0-BYTE 7. Thus, the zero parity bit (1010*a*) identifies the parity of BYTE 0 (1004). The other parity bits each respectively correspond to the like numbered data byte within the same word.

*Memory word arrangement—FIG. 17, Sheet 11*

Referring now to FIG. 17 (Sheet 11), the arrangement of data words in four memory units of a data processing machine in accordance with the present invention is shown. This arrangement of data words may be utilized for the fully distributed mode of operation or for the overlapped mode of operation which were described previously. The designations given to the words in the various memory units may be thought of as being roughly representative of addresses in the units.

The example shown contains 1024 words, which equals a possibility of two to the sixteenth power bit addresses. The addresses are distributed in sequence in an overlapped fashion between the various units. Thus MEMORY 0 contains WORD 0, WORD 4, . . . WORD 1020; MEMORY 1 contains WORD 1, WORD 5, . . . WORD 1021; . . . and MEMORY 3 contains WORD 3, WORD 7, . . . WORD 1023. Thus, if each location in memory were used to store data unrelated to any other location, and if a series of sequential addresses were called for by the computer, each memory unit would be called in turn following the next lower numbered memory unit in the sequence. This enables the overlapped mode of operation wherein four memory units, each having a speed roughly one-fourth as fast as the main computing unit, may operate sequentially, in overlapped fashion. When in this mode of operation, for example, MEMORY 2 might be in its first quarter cycle of operation, MEMORY 1 in the second quarter cycle of operation, MEMORY 0 in its third quarter cycle of operation and MEMORY 3 in its fourth quarter cycle of operation; this condition might exist if WORD 3, WORD 4, WORD 5 and WORD 6 were called for in sequence. The quarter cycles of operation (just referred to) subdivide a complete cycle of operation required for retrieving and/or storing data in a particular area of memory. A fuller description of the relationship between the various memory units shown in FIG. 17 will be given hereinafter.

Figure 1:
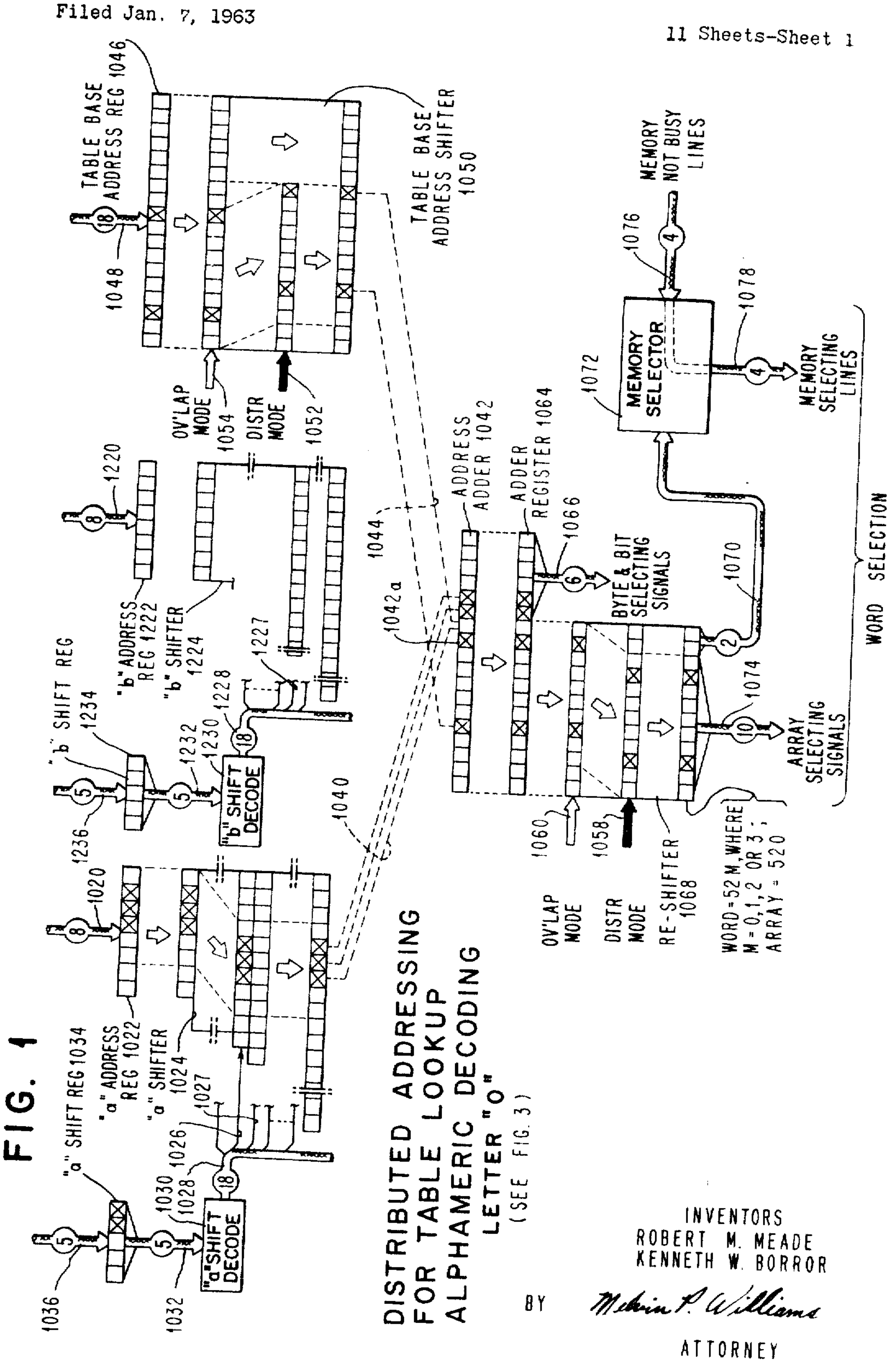
FIG. 1 is a simplified schematic block diagram of apparatus in accordance with a preferred embodiment of the invention with notation applied to illustrate distributed addressing for table lookup alphameric decoding.
Figure 3:
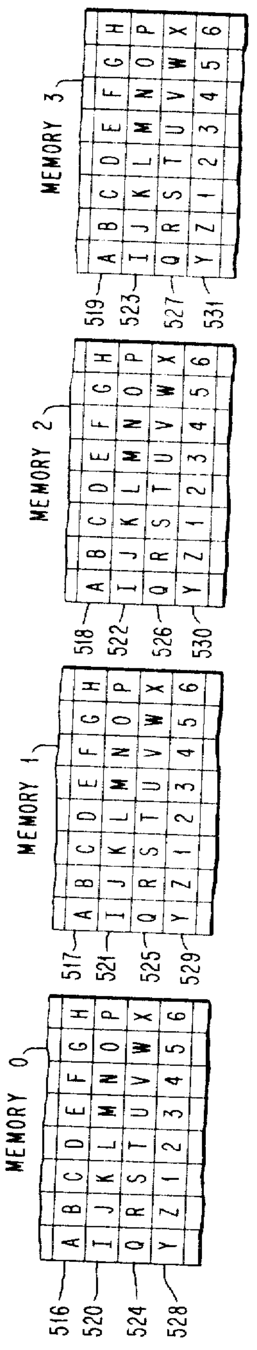
FIG. 3 is a simplified and partially broken away diagram of memory units in accordance with the present invention with notation applied to illustrate distributed alphameric decoding in accordance with FIG. 1.

*Table lookup in distributed mode—FIG. 1, Sheet 1; FIG. 3, Sheet 3*

FIG. 1 (Sheet 1) shows, in simplified schematic diagram form, apparatus in accordance with the present invention wherein symbolic legends have been applied to represent the distributed mode of addressing which may be utilized for table lookup alphameric decoding of an incoming signal.

The mode of operation shown in FIG. 1 is illustrated further in FIG. 3. FIG. 3 shows roughly the center section of each of the memory units MEMORY 0, MEMORY 1, . . . MEMORY 3. Each of the memories contains, in corresponding storage positions, the same letter of the alphabet, or number of the decimal number system, as all of the other memory units. It is to be noted that each horizontal row in each memory unit comprises a data word, as illustrated in FIG. 17 (Sheet 10), and described hereinbefore. Thus, each of the letters or numbers stored in the memory units occupies a byte of a word, each byte containing eight bits. Furthermore, it should be noticed that, consistent with FIG. 17 (Sheet 10), sequentially numbered words appear and are distributed among the different memory units; thus word 516 is in MEMORY 0, word 517 is in MEMORY 1, and so forth.

It will further be noticed that any letter may be decoded by addressing the corresponding word and byte of *any* one of the four memory units. This then is the simplest explanation of the purpose of the present invention.

For example, if the letter O is to be decoded, it is immaterial which memory unit is addressed in order to derive the corresponding code representative of the letter O. Thus, if MEMORY 0 and MEMORY 1 are busy, then either MEMORY 2 or MEMORY 3 may supply the coded designation corresponding to the letter O, in the exemplary table lookup operation about to be described. As is well known in the data processing art, table lookup operations are generally achieved by having a coded manifestation of, for instance, an alphameric letter coded in such a fashion that the code represents the address in memory of the corresponding solicited code which is to represent the alphameric character being decoded. More simply stated, the first code of the character is the address of the location in which is stored the second code of the character.

Referring to the upper left of FIG. 1 (Sheet 1), a trunk of eight lines 1020 transmits a code comprising up to eight bits to an "*a*" ADDRESS REGISTER 1022. (The "*a*" designation of the "*a*" ADDRESS REGISTER 1022 is significant only when used together with a "*b*" ADDRESS REGISTER, also shown in FIG. 1, but not in use in this example.) In the example given, the code comprises only six bits: the low order bit and the two high order bits are zero, and the remaining three bits are ones, as shown by *x*'s in the corresponding squares. This is the address code for the letter O in the memory units of FIG. 3, as described more fully hereinafter. The address bits stored in the "*a*" ADDRESS REGISTER 1022 are transferred to an "*a*" SHIFTER 1024 for shifting an amount which corresponds to the size of the storage blocks used in the memory units in any particular mode of operation. In the present example, each block is equal to a byte which contains eight bits of information. Thus, in the present example, the "*a*" SHIFTER 1024 must shift the "*a*" address bits by eight units, which is accomplished by shifting three binary columns. (The "*a*" shifter must accommodate all possible cell sizes; here, all 1024 words may be combined in one cell: to do this, a shift of eighteen columns would be required.) The control over the "*a*" SHIFTER 1024 is accomplished by appropriate shift signal lines 1026, 1027 of a trunk in eighteen shifting lines 1028. The lines 1028 comprise the output of an "*a*" SHIFT DECODE circuit 1030, the input of which is transmitted over a trunk of five lines 1032 from an "*a*" SHIFT REGISTER 1034. (This is not a shifting-type of register.) The "*a*" SHIFT REGISTER 1034 receives signals over a trunk of five lines 1036 from a main programming control unit of a computer (not shown), which designates the size of the memory cell being used in the currently programmed operation. The *x*'s within the two low order stages of the "*a*" SHIFT REGISTER 1034 represent ONES in the two low order bits of the incoming shift code, which equal a quantity of three. This then causes the "*a*" SHIFTER 1024 to shift the "*a*" address three columns, as can be seen with reference to the arrows and dotted lines applied to the "*a*" SHIFTER 1024. Thus in the example given, the line 1026 is energized, and the remainder of the trunk of eighteen lines 1028 are inoperative. The "*a*" SHIFTER 1024 is shown in simplified form, a good deal of it being broken away for simplicity. However, it is contemplated that a shift of as many as eighteen columns might be utilized, and thus the trunk of lines 1028 would provide eighteen different shift control lines (such as the lines 1026, 1027) so as to achieve any of the shifts possible in the "*a*" SHIFTER 1024.

The output of the "*a*" SHIFTER 1024, as shown diagrammatically by the dotted lines 1040, is applied to an ADDRESS ADDER 1042. The ADDRESS ADDER 1042 also receives address information, over a trunk of lines diagrammatically represented by the dotted lines 1044, which is derived from a TABLE BASE ADDRESS REGISTER 1046.

The TABLE BASE ADDRESS REGISTER 1046 specifies the area of memory which represents the particular operation being performed. In the instant example, the TABLE BASE ADDRESS REGISTER 1046 receives, over a trunk of eighteen lines 1048, a coded designation which represents the base address of the area in the memory units which is utilized for alphameric table lookup decoding. The *x*'s shown in the ninth from lowest order and third from highest order stages of the TABLE BASE ADDRESS REGISTER 1046 represent binary digits in the table base address of two to the ninth power (which equals 512 in decimal notation), and two to the second power (which equals four in decimal notation). This makes a total decimal value of 516 which equals the table base address for the alphameric decoding table shown in FIG. 3. It will be noted that the lowest word address in the alphameric decoding table also bears an address value of 516. The use of the six low order stages of the TABLE BASE ADDRESS REGISTER 1046 will be described more fully hereinafter with respect to "count" operation memory addressing shown in FIGS. 12 and 14.

The table base address must be combined with the unique address of the character in the "*a*" ADDRESS REGISTER in such a fashion as to uniquely specify a single memory block containing the new code designation for the character to be decoded. In order to accomplish this, the TABLE BASE ADDRESS REGISTER 1046 transmits the manifestation of the table base address to a TABLE BASE ADDRESS SHIFTER 1050, which will either transmit the code as received, or shift it two positions to the right, as shown in FIG. 1. The shifting or non-shifting of the table base address code is controlled by coded manifestations applied to the TABLE BASE ADDRESS SHIFTER 1050 from the main programming unit, as illustrated by the arrows 1052 and 1054. In FIG. 1 the arrow 1052 is shown solid to illustrate the fact that the shifting mode of operation is being employed in the present example. Although the table base address code is shifted two positions to the right by the TABLE BASE ADDRESS SHIFTER 1050, it will again be shifted two positions to the left after being combined in the ADDRESS ADDER 1040 with the "*a*" address code from the "*a*" SHIFTER 1024. For that reason, there is no numerical significance to the new value of the table base address code, and no explanation thereof will be given.

In the ADDRESS ADDER 1042, the shifted "*a*" address code on lines 1040 is added to the shifted table base address code on lines 1044. This is illustrated by the fact that the seventh from lowest ordered stage of the ADDRESS ADDER 1042 has received a bit from each of the "*a*" SHIFTER 1024 and the TABLE BASE ADDRESS SHIFTER 1050, and this has resulted in a zero in that stage with a carry to the next higher order stage, which stage is indicated by reference numeral 1042*a*. The resulting code from the ADDRESS ADDER 1042 is applied to an ADDER REGISTER 1064, the six low order stages of which comprise the BYTE and BIT SELECTING SIGNALS on a trunk of six lines 1066. The remaining, high order stages of the ADDER REGISTER 1064 are applied to a RE-SHIFTER 1068 where the high order result of adding the table base address code to the "*a*" address code is shifted two positions to the left. This is accomplished under command of the main programming unit of the computer due to control of lines represented by the dark arrow 1058 (the light arrow 1060 is not used in this mode). It should be understood that this will cause the table base address code portion of the result to resume its original numerical value of 516. However, the total resulting value will be that which specifies the word which contains the particular memory block (in this case a byte of a word) that is storing the coded manifestation of the letter being decoded. In this case, reference to FIG. 3 shows the letter O to be stored in a byte within WORD 520. Thus a numerical value of four has to be added to (by the "*a*" address code) the table base address of 516 in order to address the word containing the letter O. This happens, in this case, as a result of the highest bit of the "*a*" address code being shifted two columns to the left by the RE-SHIFTER 1068.

It should be noted that the two low order bits at the output of the RE-SHIFTER 1068 comprise a trunk of two lines 1070 which are applied to a MEMORY SELECTOR 1072. The remaining high order bits at the output of the RE-SHIFTER 1068 comprise a trunk of ten lines 1074 which contain ARRAY SELECTING SIGNALS.

The relationship between the selected word in memory and the array selecting signals is shown in the notation at the bottom left of FIG. 1. In order to decode the letter O, it is necessary to address any one of the following: WORD 520, WORD 521, WORD 522 or WORD 523. Thus, in the notation, a word can be said to equal 52M where M equals 0, 1, 2 or 3. The array address which corresponds to the word 52M is 520. Thus the array address, which is specified by the ARRAY SELECTING SIGNALS on the trunk of ten lines 1074, is the word address for the lowest word which contains the letter being decoded. As a further example, in FIG. 3, an array address of 528 will specify any one of the words 528, 529, . . . 531. The physical significance of these addresses will be more apparent as the description proceeds.

The MEMORY SELECTOR 1072 may respond to the trunk of two lines 1070 bearing address manifestations from the RE-SHIFTER 1068, or it may respond to a signal on a selected one of four MEMORY NOT-BUSY LINES 1076, which signal merely designates the fact that a corresponding one of the memory units is not currently being used (or, as may be true in a particular application in a high speed computer, that the memory unit will be free for use at a predetermined future time). The MEMORY SELECTOR 1072 develops a signal on a selected one of four MEMORY SELECTING LINES 1078, as described in more detail hereinafter. The purpose of the MEMORY SELECTING LINES 1078 is to designate the particular one of the four memories in the present embodiment which is to currently initiate a cycle of operation. It should be understood that since the distributed mode of operation (currently being described) can utilize any one of the four memory units, it is only necessary to know which one of the units is available for operation. No complicated programming scheme, counting system, or other means are required; all that is required is a signal from each memory unit whenever it has completed (or very soon will complete) its operations.

Figure 5:
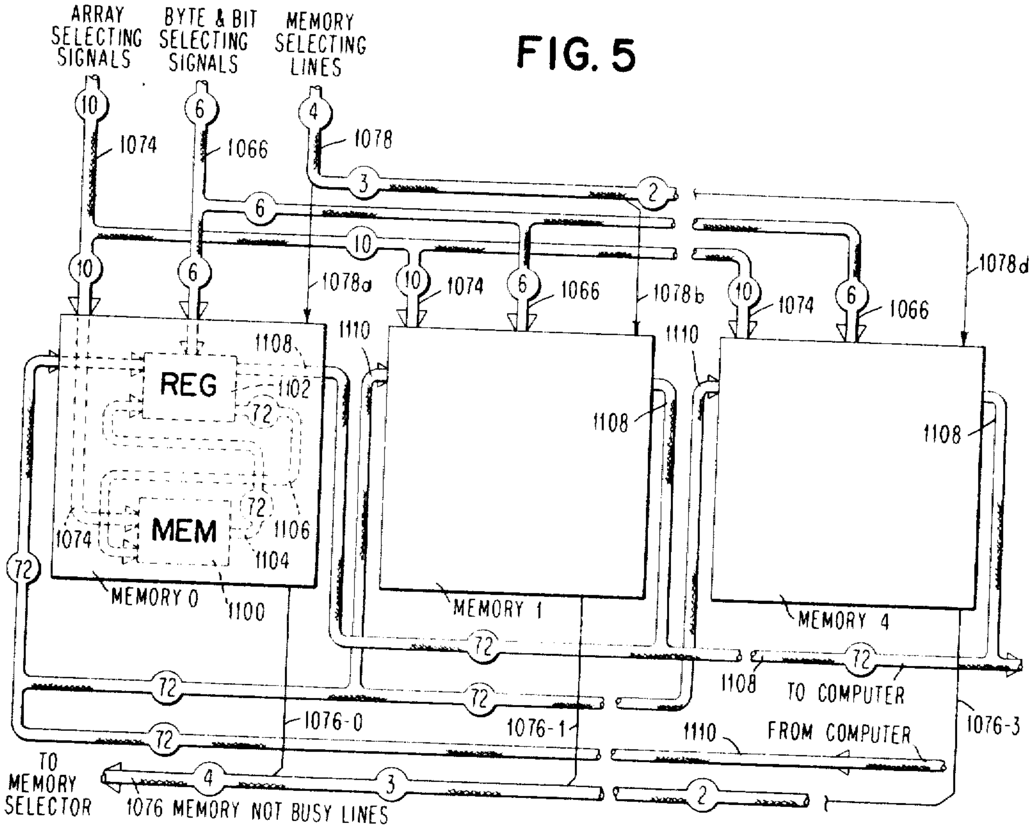
FIG. 5 is a simplified schematic block diagram, partially broken away, of the memory units of FIGS. 3 and 4 illustrating the interconnection between the memory units and the apparatus shown in FIGS. 1 and 2.

*MEMORY structure—FIG. 5, Sheet 4*

The structure of the memory units is shown partially broken away and in simplified schematic form in FIG. 5 (Sheet 4). In FIG. 5, MEMORY 3 has been omitted to save space, but the structure is identical to that of MEMORY 1, shown therein. Each of the memory units contains a MEMORY portion 1100 and a REGISTER portion 1102. The MEMORY portion 1100 contains the storage blocks within which the various letters and numerals are stored (as shown in FIG. 3); the REGISTER portion 1102 is utilized as an input and output control for the MEMORY portion 1100. Thus, the output of the MEMORY portion 1100 comprises a trunk of 72 lines 1104 which are applied to the REGISTER portion 1102, and one output of the REGISTER portion 1102 comprises a trunk of 72 lines 1106 which supply the data input to the MEMORY portion 1100. The other output of the REGISTER portion 1102 comprises, together with similar outputs from the other register portions (not shown), a trunk of 72 lines 1108 which supplies the data from the memory units to the main computer unit (not shown) for utilization in data processing. The other input to the REGISTER portion 1102 comprises, together with similar inputs to the other register portions (not shown), a trunk of 72 lines 1100 which carries data from the main computer unit (not shown) to the REGISTER portion 1102 for ultimate storage in the MEMORY portion 1100.

The relationship between the REGISTER portion and the MEMORY portion may be seen, and the details of a register portion suitable for use in the memory units of this embodiment are clearly shown in a copending application by F. E. Sakalay, Serial No. 129,687 filed August 7, 1961, now Patent No. 3,222,652, and assigned to the assignee of the present application. Details of memory structure and operational addressing thereof may be found in Patent No. 2,960,683, R. A. Gregory et al., filed June 20, 1956 and issued November 15, 1960 and in a copending application by Lars O. Ulfsparre, Serial No. 79,899 filed December 30, 1960, now Patent No. 3,231,863, the patent and application being assigned to the assignee of the present application.

Referring conjointly to FIG. 1 (Sheet 1) and FIG. 5 (Sheet 4), the trunk of ten lines 1074 bearing ARRAY SELECTING SIGNALS from the RE-SHIFTER 1068 are utilized in the memory units to select the particular word (such as WORD 520) which will be extracted from one of the memory units. The particular memory unit from which this word is to be extracted is determined by which line of the trunk of four MEMORY SELECTING LINES 1078 is energized. Thus, if MEMORY SELECTING LINE 1078*a* (FIG. 5) is energized, MEMORY 0 will be used. The BYTE AND BIT SELECTING SIGNALS on lines 1066 are utilized by the REGISTER portion 1102 to select a particular byte, and/or a particular bit of that byte, for manipulation within the REGISTER portion 1102 in certain instances (one such instance will be described hereinafter with respect to FIGS. 12 and 14). The BYTE AND BIT SELECTING SIGNALS on line 1066 are also applied to the main computer unit for manipulating words supplied thereto by the trunk of 72 lines 1108, as described hereinbefore.

Each of the memory units has an output line which signifies the fact that it is not busy. Such lines signifying an idle condition are well known in the art, and no special requirements obtain to warrant further explanation here. Thus MEMORY 0 will generate a signal on line 1076–0 at the time that it becomes available for assignment to a future job. These lines are collected into the trunk of four lines 1076 for application to the MEMORY SELECTOR 1072.

Figure 2:
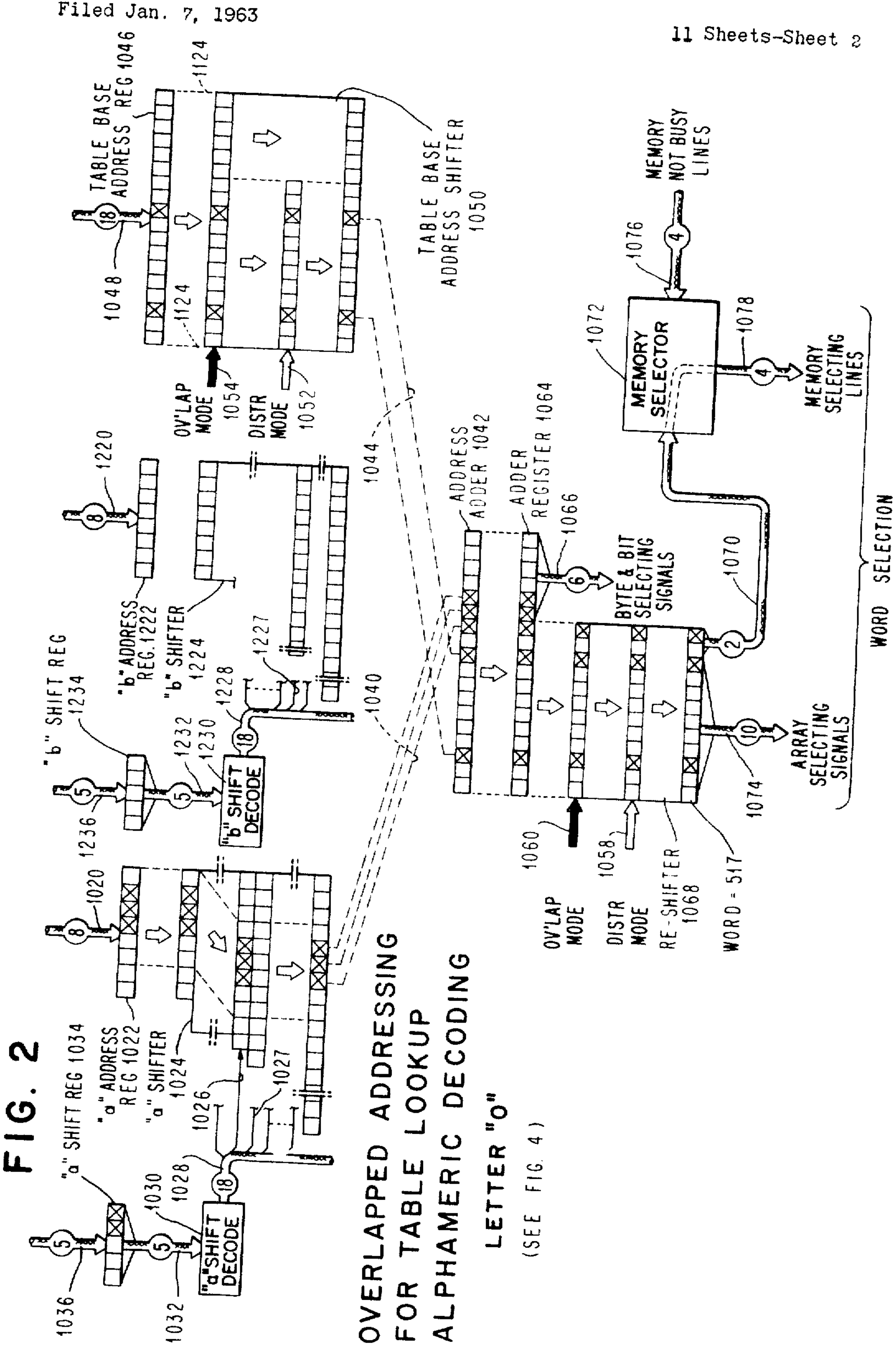
FIG. 2 is a simplified schematic block diagram of the apparatus of FIG. 1 with notation applied to illustrate overlapped addressing for table lookup alphameric decoding.
Figure 4:
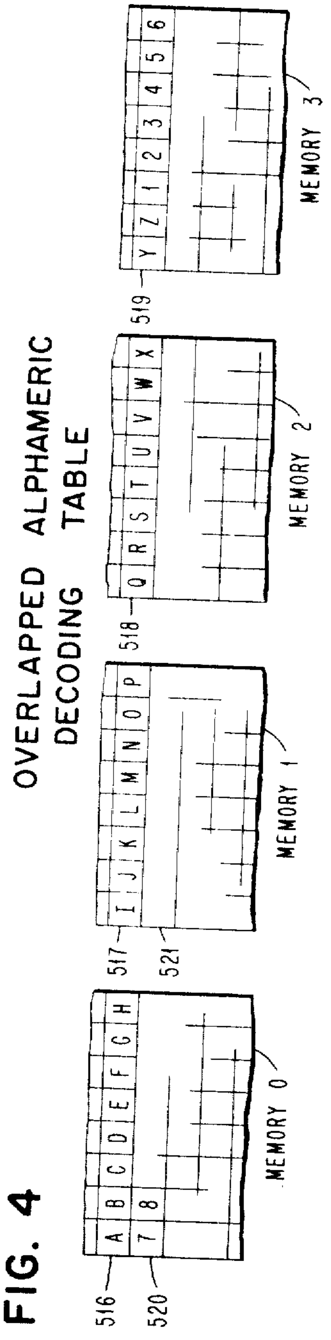
FIG. 4 is a simplified and partially broken away diagram of the memory units of FIG. 3 with notation applied to illustrate overlapped alphameric decoding in accordance with FIG. 2.

*Table lookup in overlapped mode—FIG. 2, Sheet 2; FIG. 4, Sheet 3*

The apparatus of FIG. 1 is shown again in FIG. 2 (Sheet 2); however, in FIG. 2, notation has been applied to represent operation of the apparatus in the overlapped mode of operation in accordance with the present invention. The arrangement of data in memory for overlapped operation in alphameric decoding is shown in FIG. 4. By comparing this with FIG. 3, it is easy to notice the difference in the two modes of operation. In FIG. 3, every alphameric character appears in the corresponding box in each one of the four memory units, whereas in FIG. 4, each alphameric character appears in only one of the memory units. Notice also that although sequential words are in adjacent memory units (that is, WORD 516 is in MEMORY 0, WORD 517 in MEMORY 1, etc.), the alphameric characters appear sequentially within the memory unit. This is due to the fact that in the present example, a block of memory (the smallest significant unit of memory) contains eight bits, and therefore, there are eight blocks of memory within each word. Thus, WORD 516 contains eight letters, "A" through "H"; WORD 517 contains eight letters, "I" through "P." Hence, the gist of a further aspect of this invention is the ability to retrieve a given letter (for instance, the letter "O" in the example used) from either a unique memory (as in FIG. 4) during overlapped operation, or from any one of the memories (as in FIG. 3) while in the distributed mode of operation; and a still further aspect is the ability to do this without any need to change the incoming "*a*" address code for the letter, for instance the letter "O," being decoded, when shifting between the two modes of operation.

The difference in addressing between the distributed mode (FIG. 1 and FIG. 3) and the overlapped mode (FIG. 2 and FIG. 4) is that the addresses of successive letters advance more slowly in the overlapped mode (FIG. 4) than they do in the distributed mode (FIG. 3) since, in the distributed mode (FIG. 3), it is necessary to overstep the duplicated letters in the successive memory units in order to get to an additional set of letters: for instance, to advance from blocks which represent letters "A" through "H" (WORD 516, etc.) to blocks which represent letters "I" through "P" (WORD 520, etc.) in FIG. 3 requires a greater advance in word signals than is required to advance from WORD 516 to WORD 517 in FIG. 4.

Referring again to FIG. 2 (Sheet 2), in the example shown (distributed addressing for table lookup alphameric decoding of the letter O), it should be noted that the information in the "*a*" SHIFT REGISTER 1034, which specifies the size of the memory block (here, eight bits), is the same as it was in FIG. 1. This is so because the nature of the character storage requirement is the same. For this reason, the "*a*" SHIFTER 1024 will shift the contents of the "*a*" ADDRESS REGISTER 1022 by three columns to the left in FIG. 2, the same as in FIG. 1. Thus, it can be said that there is no difference in the "*a*" address code as it leaves the "*a*" SHIFTER and is applied by lines 1040 to the ADDRESS ADDER 1042. On the other hand, although the TABLE BASE ADDRESS REGISTER 1046 contains the same basic address in FIG. 2 as it does in the example of FIG. 1, the TABLE BASE ADDRESS SHIFTER 1050 is operated so as to accommodate the overlapped mode of operation, as indicated by the solid arrow 1054, so that the table base address code is not shifted by the SHIFTER 1050. Thus, the table base address code is added into the ADDRESS ADDER 1042 in FIG. 2 in stages which are two columns to the left of the stages wherein the table base address code was added in FIG. 1.

The output of the ADDRESS ADDER 1042 is applied, as before, to the ADDER REGISTER 1064. The six low order bits of the ADDER REGISTER output comprise the BYTE AND BIT SELECTING SIGNALS on a trunk of six lines 1066, as in FIG. 1. The output of the remaining, high order stages of the ADDER REGISTER 1064 are applied to the RE-SHIFTER 1068, but the RE-SHIFTER 1068 is controlled by the overlapped mode, as illustrated by the solid arrow 1060, and no shifting of the adder output code is effected. Thus, the output of the RE-SHIFTER 1068 now has a numerical value of 517, whereas in FIG. 1 the output was equal to 52M, where M may be 0, 1, 2 or 3 as determined by the MEMORY SELECTOR 1072. Referring to FIG. 4, it can be seen that the letter O appears in MEMORY 1, WORD 517. It may be observed also that the only place where the letter O appears within the decoding table is in MEMORY 1. Thus, selection of a memory unit, MEMORY 0, MEMORY 1, . . . MEMORY 3, is now a significant part of the addressing, whereas in the distributed mode of FIG. 1 and FIG. 3, selection of the memory unit was not a function of addressing. This difference is illustrated in terms of structure by the fact that the trunk of two lines 1070 which contain the output signals for the two lowest ordered stages of the RE-SHIFTER 1068 are utilized by the MEMORY SELECTOR 1072 in order to energize the correct one of the MEMORY SELECTING LINES 1078. However, in FIG. 1, there can be no output from the two lowest ordered stages of the RE-SHIFTER 1068 due to the fact that the input to the RE-SHIFTER 1068 is shifted two stages to the left.

A complete comparison of the two modes of operation, together with the significance of the various operating modes of the individual circuits, will be given after discussing further details of the component circuits, in the light of the two modes of operation which said circuits must fulfill.

Figure 6:
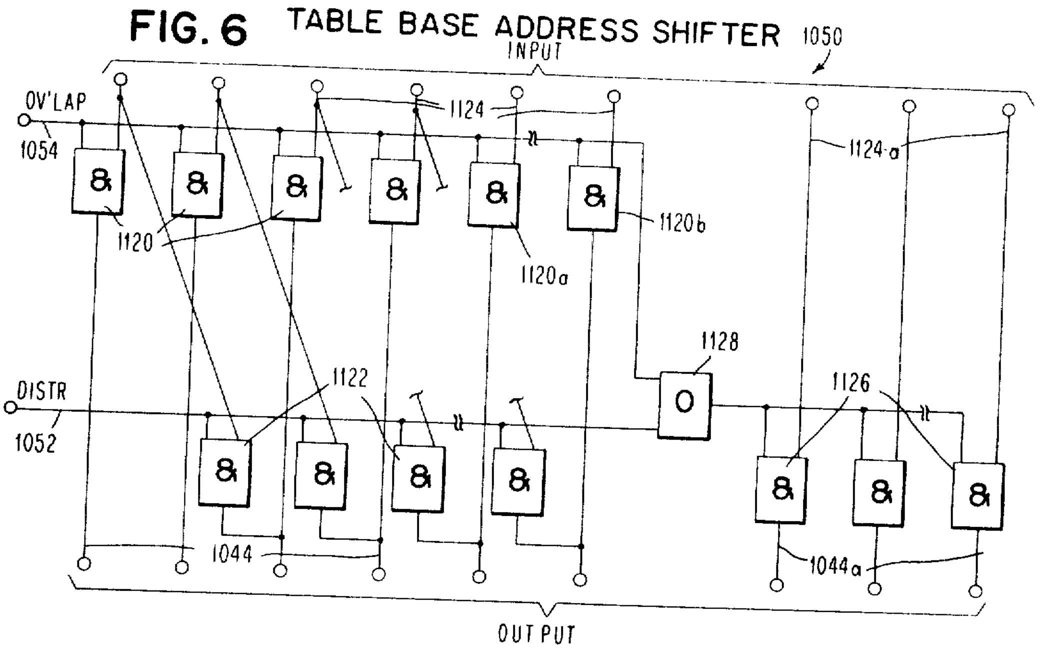
FIG. 6 is a schematic block diagram of an exemplary table base address shifter for use in conjunction with the apparatus shown in FIGS. 1 and 2.

*TABLE BASE ADDRESS SHIFTER structure—FIG. 6, Sheet 4*

The TABLE BASE ADDRESS SHIFTER 1050 (shown in both FIGS. 1 and 2) is illustrated in simplified schematic form in FIG. 6. (Sheet 4). Control over the TABLE BASE ADDRESS SHIFTER 1050 was illustrated in FIGS. 1 and 2 *by arrows* 1054 *and* 1052. These actually comprise control lines 1052, 1054 which select either of two banks of AND circuits 1120, 1122. The input to the TABLE BASE ADDRESS SHIFTER is applied from the TABLE BASE ADDRESS REGISTER 1046 (FIGS. 1 and 2) over a trunk of eighteen lines 1124. Each of the twelve highest ordered lines 1124 is applied as one input to both the first bank of AND circuits 1120 and the second bank of AND circuits 1122. The six low order lines **1124*a* are applied to a third bank of AND circuits 1126. In the overlapped mode of operation, no shifting of the twelve highest ordered bits of the table base address code is to be effected. Thus, energization of the line 1054 will cause signals on the twelve highest ordered lines 1124 to pass directly through a first bank of AND circuits 1120 onto the TABLE BASE ADDRESS SHIFTER output lines 1044. On the other hand, during the distributed mode of operation, the signals on the twelve highest ordered lines 1124 are to be shifted two columns to the right, and this is effected by means of a signal on the line 1052 causing the second bank of AND circuits 1122 to pass the signals on lines 1124 through the second bank of AND circuits 1122 to output lines 1044**, each of which is two columns to the right of the lines on which the corresponding signals came in.

It is to be noted that the two lowest order AND circuits **1120*a* and 1120*b* comprise the only way in which a signal can pass from the corresponding input lines 1124 to the related output lines 1044. This is so because in shifting to the right, there are no AND circuits 1122 to the right of AND circuits 1120*a* and 1120*b***.

An OR circuit 1128 is provided so that whether in overlapped or distributed mode, the signals on the six lowest ordered lines **1124*a* may be passed through the third bank of AND circuits 1126, without shifting, to the six lowest ordered ones of the output lines 1044*a***.

A comparison of the representation of the TABLE BASE ADDRESS SHIFTER 1050 as seen in FIGS. 1 and 2 with the circuit thereof shown in FIG. 6 indicates certain ambiguities. It should be understood that the representation in FIGS. 1 and 2 is diagrammatic and illustrative merely, being chosen to most clearly set forth the function of the shifter. The simplified structure of FIG. 6 represents the arrangement of actual component circuits which may be used to build a shifter suitable to the use here intended. It should be further understood that in FIGS. 1 and 2 the output lines 1044 are shown representing the actual signals being transmitted from the TABLE BASE ADDRESS SHIFTER 1050 to the ADDRESS ADDER 1042. In fact, each stage of the TABLE BASE ADDRESS SHIFTER 1050 is always connected by a suitable line to a corresponding stage of the ADDRESS ADDER 1042, and the presence or absence of a signal thereon is dependent upon the table base address code for the particular operation being performed, and whether or not a shift has occurred in the TABLE BASE ADDRESS SHIFTER 1050.

Any other suitable shifter capable of selectively shifting the twelve highest ordered signals two columns to the right, or passing them without shifting, in dependence upon the mode of operation, may be used in order to conform to any specific utilization which may be contemplated.

Figure 7:
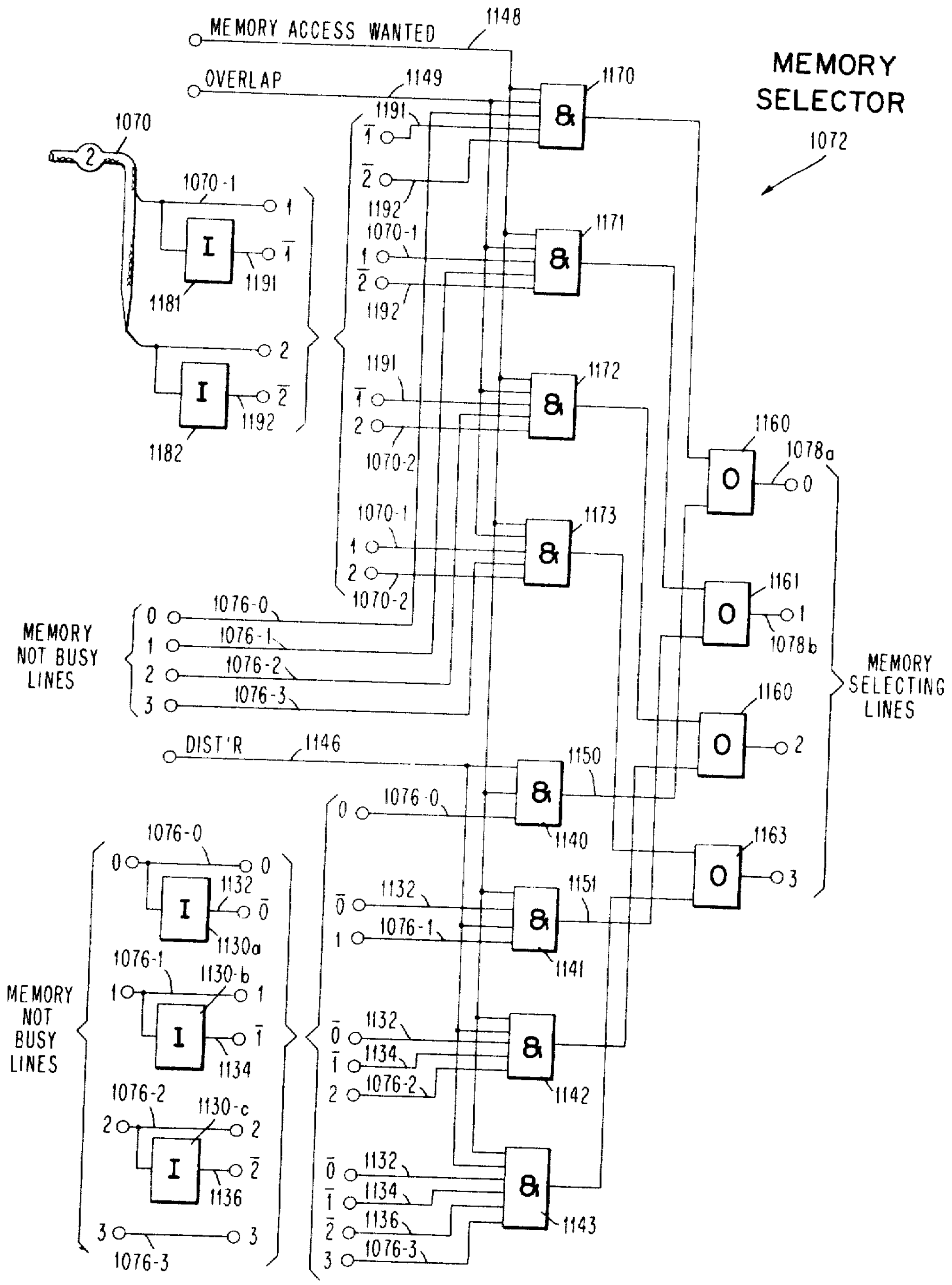
FIG. 7 is a simplified schematic block diagram of an exemplary memory selector circuit for use in conjunction with the apparatus of FIGS. 1 and 2.

*MEMORY SELECTOR structure—FIG. 7, Sheet 5*

The upper left-hand portion of FIG. 7 controls memory selection in the overlapped mode whereas the lower left-hand portion controls memory selection in the distributed mode. The center right-hand section combines the effects of the other two sections. Recalling the discussion of distributed addressing with respect to FIG. 1, when in the distributed mode, the selection of the memory unit is not a function of addressing, but rather a function only of which memory unit may be utilized to perform the necessary operations. In other words, all that is necessary is to recognize any one of the four memory units which either is not busy, or will not be busy at a time in the immediate future when the actual use of the memory will be required.

In the distributed mode of operation, the MEMORY NOT BUSY LINES 1076 control operation of the MEMORY SELECTOR 1072. Each of these lines is applied to a corresponding inverter circuit 1130 so as to supply the complement of a signal on that line. Thus if MEMORY 0 is busy, there will be no signal on MEMORY NOT BUSY LINE 1076–0, but there will be an output from inverter 1130*a*. Similarly, in the absence of a signal on MEMORY NOT BUSY LINE 1076–1, there will be an output from inverter 1130*b* on line 1134. Also, absence of a signal on MEMORY NOT BUSY LINE 1076–2 will cause an output from inverter 1130*c* on line 1136. All of these lines 1076 and 1132–1136 are applied as inputs to a plurality of AND circuits 1140–1143. Other inputs to these AND circuits include a signal from the main programming unit of the computer (not shown), which indicates distributed mode of operation, on a line 1146, and an additional signal from the main computing unit of the system, indicating that memory access is wanted, on a line 1148.

When memory access is wanted, the line 1148 will permit any of the AND circuits (shown in the same column with the AND circuits 1140–1143) to be operative. When in distributed mode, a signal on a line 1146 also enables these AND circuits to operate. The operation of the AND circuits 1140–1143 thereafter depends upon which of the memory units are available. In order to avoid the necessity of a complex counting scheme or other allocation arrangement, a simple preference scheme has been utilized in the preferred embodiment. The simplicity of this circuit will be realized following the explanation thereof. If MEMORY 0 is available, then line 1076–0 will apply a signal to the AND circuit 1140. At the same time, the line 1132 from the inverter 1130*a* will have no signal on it, and this will block each of the other AND circuits 1141–1143. Thus there will be a single output on the line 1150 which will pass through an OR circuit 1160 onto memory selecting line 1078*a* for selecting MEMORY 0. On the other hand, if there is no signal on MEMORY NOT BUSY LINE 1076–0, which indicates that MEMORY 0 is busy, then there will be a signal on line 1132, which means that any one of the other memory units may be selected by a corresponding AND circuit 1141–1143. Hence, if MEMORY 1 is not busy, there will be a signal on MEMORY NOT BUSY LINE 1076–1 which will enable AND circuit 1141 to supply a signal on line 1151 through OR circuit 1161 to line 1078*b*. In a similar fashion, the other AND circuits 1142 and 1143 will operate only if all the preceding AND circuits (such as 1140 and 1141) cannot be operated, due to the fact that the corresponding memory units are busy.

If the apparatus is operating in the overlapped mode, then there will be a signal on a line 1149 which will permit a plurality of AND circuits 1170–1173 to select the correct one of the memory units in accordance with the address under consideration. Control over these AND circuits is vested in the outputs of the two lowest order stages of the RE-SHIFTER 1068 on the trunk of two lines 1070. Thus, the combination of signals on the two lines 1070 correspond to the lowest ordered bit positions of the address code output of the RE-SHIFTER. Of the trunk of two lines 1070, the line 1070–1 represents the lowest ordered bit position, which is shown in FIG. 7 to represent a value of ONE, and the line 1070–2 represents the next to lowest ordered bit position and is shown in FIG. 7 to a numerical value of TWO. Both of these lines are applied to corresponding inverter circuits 1181, 1182 so as to provide complementary outputs on corresponding lines 1191 and 1192. The operation of the AND circuits 1170–1173 in response to these signals is the same as that described hereinbefore with respect to AND circuits 1140–1143. The selection of the one AND circuit 1170–1173 which will operate and thereby energize a corresponding one of the OR circuits 1160–1163 is equivalent to the total numerical value of the combinational signal on the trunk of two lines 1070; this contrasts with the preference circuit utilized in the distributed mode as governed by the AND circuits 1140–1143 as before described. When in the overlapped mode, the AND circuits 1170–1173 are also controlled by signals on the MEMORY NOT BUSY LINES 1076. In this case, however, the lines 1076 are used to block any AND circuit when the corresponding memory unit is already busy. Thus, with reference to FIG. 2 and FIG. 4, if the letter O is selected for decoding at a time when any of the other letters I–P are being decoded, then there will be no signal on line 1076–1 due to the fact that MEMORY 1 is already busy. Thus, the AND circuit 1171 will be blocked by the lack of a signal on a line 1076–1 and there can be no selection of a memory unit for that desired operation. The decoding of the letter O would, in such a case, have to be deferred until such time as MEMORY 1 becomes available as indicated by a signal on MEMORY NOT BUSY LINE 1076–1. The exact details of how this operation is to be deferred, and the nature of interrupt programming of the various portions of the computer system, are left to the design of a system for use with a particular utilization of the subject invention. It is not critical to the invention, and any number of well-known alternative arrangements may be selected.

*Miscellaneous structure—FIG. 1, Sheet 1*

It should be understood that FIGS. 1 and 2 show structure of an exemplary embodiment of the present invention in such a form as to most clearly present the invention itself, without having such details of structure as will cause confusion and prevent the understanding of the invention. Certain of the circuits therein have been shown in greater detail, other circuits are so well known that additional details may be found with reference to the art in general. For instance, any of the registers such as the "*a*" SHIFT REGISTER 1034, the TABLE BASE ADDRESS REGISTER 1046, etc., may comprise any form of register which includes stable storage stages arranged in an ordered sequence. These might be comprised of triggers, magnetic cores, or other bistable devices. Examples of suitable registers may be found in the aforementioned applications, Serial No. 129,687 and Serial No. 79,899, and the aforementioned Patent 2,960,683. The "*a*" SHIFT DECODE circuit may be any well-known form of circuit which can decode five binary digits into a single one of eighteen decimal digits, utilizing the principles fully disclosed in the aforementioned application Serial No. 129,687.

It should also be recognized that the "*a*" SHIFTER 1024 and the RE-SHIFTER 1068 may be developed by straightforward application of the techniques utilized in developing the TABLE BASE ADDRESS SHIFTER which was discussed with reference to, and disclosed in FIG. 6.

*Details of gist of invention—FIGS. 1, 2, 3 and 4*

As before described, the "*a*" address code is handled in the fashion which is well known in the table lookup art. It has nothing to do with the choice of distributed or overlapped operation, other than to control some of the characteristics of the invention which permits use of either mode of operation in a table lookup application. It is to be recalled that the "*a*" SHIFTER 1024 shifts the "*a*" address code to the left a sufficient number of binary columns to equal the numerical size of the basic memory cell or block. In the given example, it took eight bits to store each letter and therefore a column shift of three binary columns accounts for a memory block size of eight.

On the other hand, the TABLE BASE ADDRESS SHIFTER 1050 and the RE-SHIFTER 1068 have not heretofore been utilized in computing systems. These two units comprise the heart of the subject invention and perform the function of allowing a single incoming address (the "*a*" address code) to specify any one of a plurality of correct locations in distributed mode of operation, or the single unique location in overlapped mode of operation.

A further feature of the invention, which is necessary in order to utilize the TABLE BASE ADDRESS SHIFTER 1050 and the RE-SHIFTER 1068, is the allocation of ordinal significance in the address codes being used. Normally, one would think that in a plural memory system, the highest ordered significance in an address would be the memory, the next highest order would be the word within the memory, followed by the byte, with the lowest order significance in the address code representing the bit to be selected. In the subject invention, each particular word in memory is represented by the highest ordered bits in the table base address code, and so word significance is represented by the highest ordered bits of the incoming address code (the "*a*" address code in the given example). The second highest ordered significance is allocated to selection of memory units. This is, as before described, contrary to the normal assignment of significance in addressing. Furthermore, it is to be noted that neither the incoming code (the "*a*" address code in the given example) nor the table base address code has memory unit selection significance in distributed mode. This is due to the fact that the shifting of the table base address code two columns to the left removes the two columns which in the overlapped mode of operation would select memory units. Furthermore, re-shifting by the RE-SHIFTER 1068 is accomplished after the "*a*" address code is added to the table base address code in the ADDRESS ADDER 1042, and this re-shifting leaves a gap in the two lowest ordered stages of the output of the RE-SHIFTER 1068 (as can be seen with reference to the non-use of the trunk of two lines 1070 in FIG. 1).

The necessity of having the table base address code specifying word addresses in the highest ordered columns, and of having the memory unit selecting portion of the address in the next highest ordered columns, is based on the fact that the selection of the memory units may be taken over by the MEMORY NOT BUSY LINES 1076 when in the distributed mode of operation (FIG. 1); while simultaneously, it is necessary to add the "*a*" address code (including word, byte and bit significant signals) to the table base address code (which itself may contain either word bit and byte signals, in distributed mode, or word, memory, byte and bit signals, in overlapped mode). Thus, the "*a*" address code does contain memory significant signals when in overlapped operation as illustrated in FIG. 2. For instance, the highest ordered bit out of the "*a*" SHIFTER 1024 (on lines 1040) is in fact the lowest ordered bit output of the RE-SHIFTER 1068 in the overlapped mode illustrated in FIG. 2. This then causes an energization of the line 1070–1 in FIG. 7 (Sheet 5), which in turn causes AND circuit 1171 to energize OR circuit 1161 thereby placing a signal on MEMORY SELECTING LINE **1078*b* to select MEMORY 1** for operation. By contrast, in the distributed mode illustrated in FIG. 1, this same highest ordered output of the "*a*" SHIFTER 1024 is added to the lowest ordered output of the TABLE BASE ADDRESS SHIFTER 1050 and ultimately becomes the fourth from lowest ordered output of the RE-SHIFTER 1068, which is the next to lowest ordered output on the trunk of ten lines 1074. Hence, in distributed mode, the letter O becomes significant in selecting the array (which defines the word within the memory, once the memory has been determined).

The above comparison is a further illustration of the fact that in distributed mode (FIG. 3) it is necessary to jump from word 516 (etc.) to word 520 (etc.) in order to get from any of the letters "A"–"H" to one of the letters "I"–"P"; whereas, in overlapped mode it is necessary to jump only from word 516 to word 517 in order to step from the first group of letters to the second group of letters. This clarifies the difference in the way that the base address and "*a*" address memory selecting bits are handled. In the embodiment of FIGS. 1 and 2, the addresses are defined so as to serve the overlapped mode. They are automatically converted when necessary, to operate in the distributed mode. Thus, the two bits of the "*a*" address code which select the correct memory unit in the overlapped mode are made MORE significant by the RE-SHIFTER 1068 so as to cause jumping from one array (i.e., WORDS 516, 517, 518, 519) to the next array (i.e., WORDS 520, 521, 522, 523) when an increment from one group of letters to another group is indicated. Contrary-wise, the bits of the base address code which select the particular memory unit in overlapped mode have no significance whatever in the distributed mode.

Although regular memory operation could be used (that is, where there is absolutely no relationship between the different memory units), this form would never be used because greatly increased speed with no loss of storage capacity is achieved in overlapped operation, and therefore there is no necessity to accommodate it in the present invention.

Since normal programming of the computer for distributed operation requires the programmer to introduce the code designation of the memory area (the table base address code), the programmer could specify a shifted code (as at the output of the TABLE BASE ADDRESS SHIFTER 1050) and eliminate the need for the ' SHIFTER 1050. As shown herein, the programmer would use the same code for either mode of operation, and the ' SHIFTER 1050 converts it, when necessary, for the distributed mode of operation.

The description of the preferred embodiment of this invention is complete at this point, the remainder of the specification dealing with additional examples of the use of invention, together with analysis of significant aspects thereof in the light of the examples given.

*Introduction to further examples*

The present invention may be utilized in complex systems, there being no known limitation to the applicability of the invention. In the remainder of the specification, examples are given of distributed and overlapped operation in combinational operations, and in operations wherein the memory units may not necessarily contain the same information even when operating in distributed mode. These examples are given to emphasize the problem which results if the incoming address codes of data which is to be operated upon has to be altered in order to use multiple memory units to service a single computer, and thereby simulate a super-speed memory apparatus, as does the subject invention. This will be discussed in more detail hereinafter.

Figure 8:
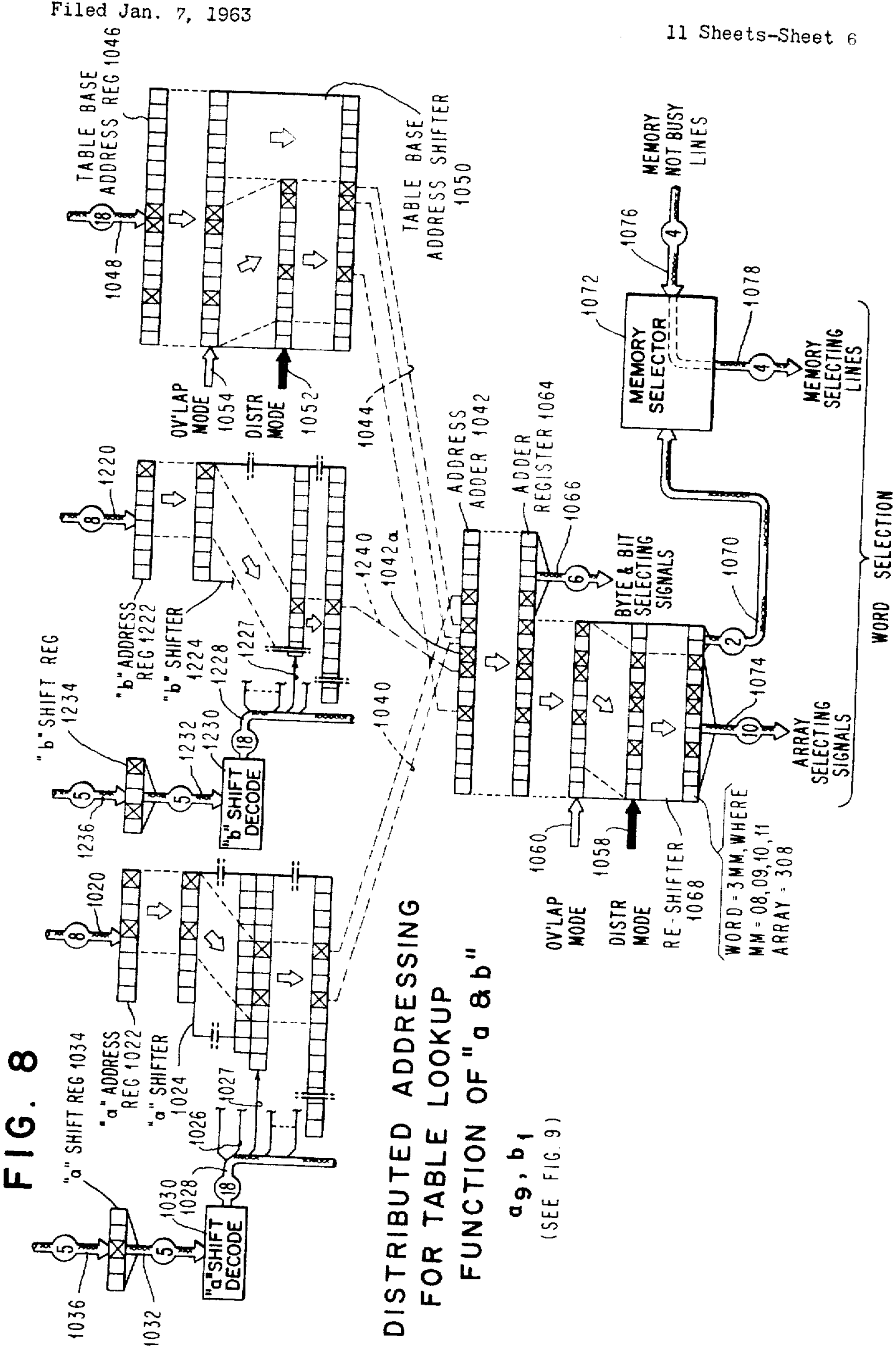
FIG. 8 is a simplified schematic block diagram of the apparatus shown in FIG. 1 with notation applied to illustrate distributed addressing for table lookup combinational operations of a function of "*a*" and "*b*"
Figure 9:
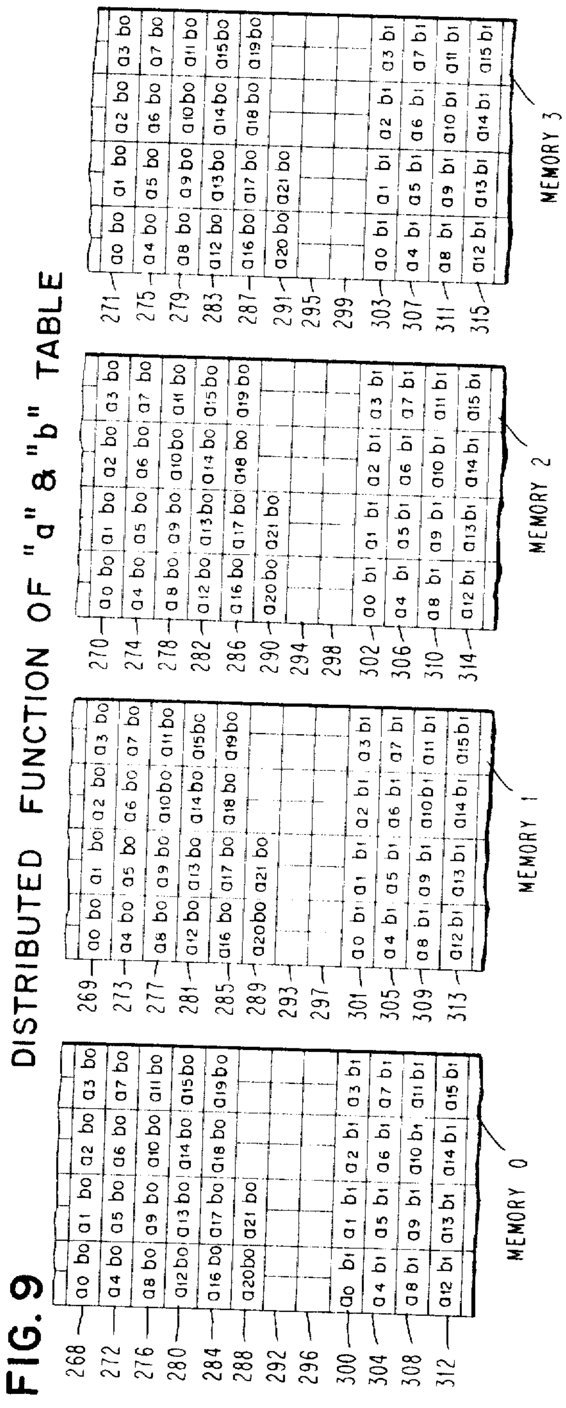
FIG. 9 is a simplified and partially broken away diagram of the memory units shown in FIGS. 3, 4 and 5 with notation applied to illustrate distributed function of "*a*" and "*b*" operations in accordance with FIG. 8.

*Function of "a" and "b" in distributed mode—FIG. 8, Sheet 6; FIG. 9, Sheet 8*

In FIG. 8 is shown the apparatus previously disclosed with respect to FIGS. 1 and 2 with notation applied so as to represent distributed addressing for table lookup combinational operations which may be considered generally to be any function of two variables "*a*" and "*b*" (such as a multiplication table). In this example, two data inputs are used instead of only one. Thus, not only is a data input applied by the lines 1020 to the "*a*" ADDRESS REGISTER 1022, but also there is a data input on a similar trunk of eight lines 1220 to a "*b*" ADDRESS REGISTER 1222. This is applied in turn to a "*b*" SHIFTER 1224 for shifting under the control of a particular line 1227 which is found in the trunk of eighteen lines 1228. The eighteen lines 1228 comprise the output of a "*b*" SHIFT DECODE circuit 1230 which derives its output by decoding a five unit combination applied thereto by a trunk of five lines 1232 from a "*b*" SHIFT REGISTER 1234; the "*b*" SHIFT REGISTER 1234 responds to signals from the main program control unit of the computer (not shown) in accordance with signals received over a trunk of five lines 1236. The operation of all the circuitry 1220–1236 (just now introduced) is identical with the circuitry (1020–1036) which handles the "*a*" address code as described hereinbefore. Although the purpose of this signal, and the functional control over the amount of shifting therein are both different, nonetheless, the reasoning behind the amount of shift applied by the "*b*" SHIFTER 1224 is the same as the reasoning behind the amount of shift applied by the "*a*" SHIFTER 1024. In the case of the "*a*" SHIFTER 1024, the "*a*" address is shifted sufficient binary columns so that, as "*a*" increases by one unit, the address will increase by as many bit positions as is necessary to reach the first bit position of the next block in memory. In the example given with respect to FIG. 1 and FIG. 3, each block in memory requires eight bit positions, so that a shift of three binary columns is required in order that an increment of one bit in the "*a*" address code will cause a shift of eight bits within the memory. In the present example illustrated in FIG. 9 (Sheet 8), each memory block contains sixteen bits, which is equal to two bytes in the data word format disclosed hereinbefore. In order to achieve a shift of sixteen bits so as to go from a first block to a second block (so as to shift from "*a0b0*" to "*a1b0*"), the "*a*" SHIFT REGISTER 1034 has stored therein a bit in the third from lowest order binary column, which equals a decimal four, thereby causing the line 1027 to cause a four column shift to the left in the "*a*" SHIFTER 1024 (as shown in FIG. 8).

In similar fashion, the "*b*" SHIFTER 1224 must shift the "*b*" address code a sufficient amount so that a single increment of one unit in the "*b*" address code will increment the address to the area of memory wherein the next higher value of "*b*" is stored. In other words, in order to increment from "*a0b0*" to "*a0b1*" in FIG. 9, it is necessary to increment the "*b*" address by eight words (from word 268 to word 300) which equals 512 bit positions. Five-hundred twelve in decimal form is equal to two to the ninth power. Therefore, the "*b*" SHIFTER 1224 must shift the "*b*" address code nine binary columns to the left. This is effected by the "*b*" SHIFT DECODE 1230 in response to a "*b*" shift code of decimal nine stored in the "*b*" SHIFT REGISTER 1234 in binary form.

Thus, the "*a*" SHIFTER shifts the "*a*" address code by an amount so that a single increment in the "*a*" address code will cause the memory to increment a plurality of bit positions in order to reach the next higher value of "*a*"; similarly, the "*b*" shift address code is shifted by such an amount that an increment of one unit in the "*b*" address code will cause an increment of a plurality of bit positions in memory so as to reach the next higher order value of "*b*." In the example shown in FIG. 9, "*b*" is held constant as "*a*" varies, and then the values of "*a*" are repeated for the next higher order of "*b*." In other words "*a0b0*," "*a1b0*," . . . "*a21b0*" appear in one area of memory followed by another area of memory which contains "*a0b1*," "*a1b1*," . . . "*a21b1*." However, this is merely exemplary, and the reverse could be true. If the reverse were true, the "*b*" SHIFTER would not then shift the "*b*" address code by an amount as great as would the "*a*" SHIFTER.

FIG. 9 illustrates some central portion of all four memory units with data stored therein so as to form a table of functions of "*a*" and "*b*." In order to increment addresses by units of value in the binary system, it is necessary that an increment in the "*b*" value correspond to some number of bits in each memory unit which is an even power of two. Thus, since twenty-one values of "*a*" are required, it is impossible to use less than eight words of each memory unit for each power of "*b*" which is to be used. In FIG. 9, all of the *b0* values and some of the *b1* values are shown, the remainder being omitted for simplicity.

In FIG. 8, the TABLE BASE ADDRESS REGISTER 1046 has stored therein a code combination which represents (discounting the six lowest ordered bits) a binary value equal to decimal value 268. This can be seen to be the lowest word in the distributed function of "*a*" and "*b*" table in all of the memory units in FIG. 9. This is shifted two units to the right by the TABLE BASE ADDRESS SHIFTER 1050 and then applied by lines (represented by the dotted lines 1044) to the ADDRESS ADDER 1042. In a similar fashion, the output of the "*a*" SHIFTER 1024 and the "*b*" SHIFTER 1224 are also applied to the ADDRESS ADDER 1042. Due to the fact that the "*a*" SHIFTER 1024 and the TABLE BASE ADDRESS SHIFTER 1050 each apply an input to a single stage of the ADDRESS ADDER 1042 (the eighth from lowest ordered stage), the result in that stage is zero with a carry to the next higher order stage (the stage indicated by reference numeral **1042*a***). Thereafter, the lowest ordered bit from the "*a*" SHIFTER 1024 is carried out as part of the BYTE AND BIT SELECTING SIGNALS on the trunk of six line 1066 through the ADDER REGISTER 1064, and the remaining, higher ordered stages of the ADDER REGISTER 1064 pass the combined address to the RE-SHIFTER 1068 where it is shifted two columns to the left under control of the distribute mode arrow 1058, as before described. Thus the output of the RE-SHIFTER 1068 on lines 1074 equals a word address of 3 MM, where MM may equal 08, 09, 10, or 11; this is equal to an array address of 308, because the array address is defined as being the lowest word address possible, as before described.

Referring now to the "*a*" ADDRESS REGISTER 1022, it can be seen that the incoming "*a*" address code is equal to decimal nine, and reference to the "*b*" ADDRESS REGISTER 1222 shows the incoming "*b*" address code to be equal to decimal one. Thus, the function of "*a*" and "*b*" here identified is "*a*9*b*1." This is seen to appear in array 308, which includes word 308, word 309, word 310 and word 311. Further, this may also be seen to be in the memory block which begins at the sixteenth bit of each of the words where it may be found. Since there are eight bytes in a bit, the function of "*a*8*b*1" is stored in BYTE 0 and BYTE 1 and the function of "*a*9*b*1" is stored in BYTE 2 and BYTE 3 of the appropriate words. Thus, reference to the ADDER REGISTER 1064 in FIG. 8 will show that a byte address (including the three high order bit positions which are applied to the trunk of six lines 1066) indicates a binary code for the decimal value two, thereby specifying that the block beginning with BYTE 2 must be utilized in order to retrieve the particular information relative to "*a*9*b*1."

With reference to FIG. 8, it is easily seen that any distributed addressing of a plurality of memories would become very complex if the "*a*" and "*b*" address both had to be changed before being utilized. Further, it is to be noted that since the shifting operation is basically concerned with the table base address code rather than the incoming "*a*" address code and "*b*" address code, it is feasible to extend the circuit illustrated in FIG. 8 so as to be able to accommodate additional incoming data (such as a "*c*" address code and a "*d*" address code). Thus, the invention is compatible with combinational operations performed in table lookup fashion as well as the simple table lookup decoding which was described hereinbefore.

Figure 11:
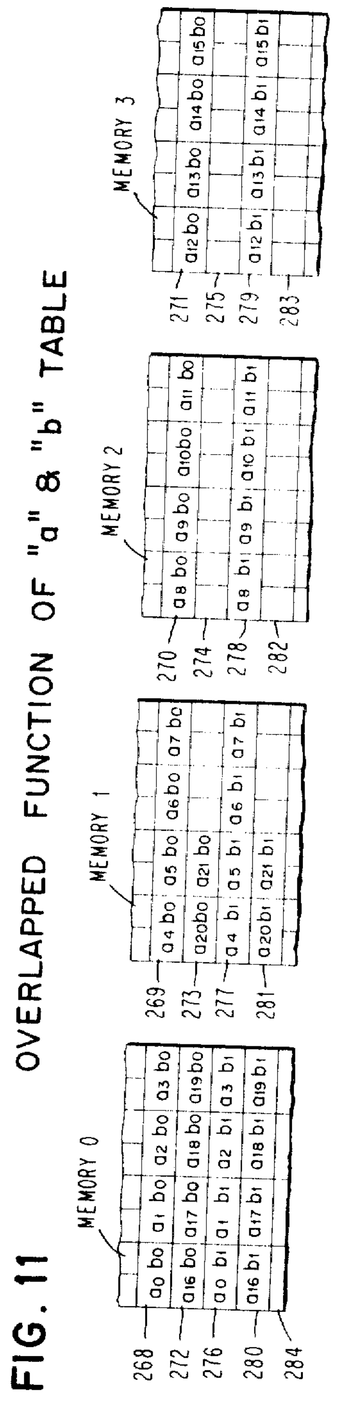
FIG. 11 is a simplified and partially broken away diagram of the memory apparatus shown in FIGS. 3, 4 and 5 with notation applied to illustrate overlapped function of "*a*" and "*b*" operations in accordance with FIG. 10.
Figure 10:
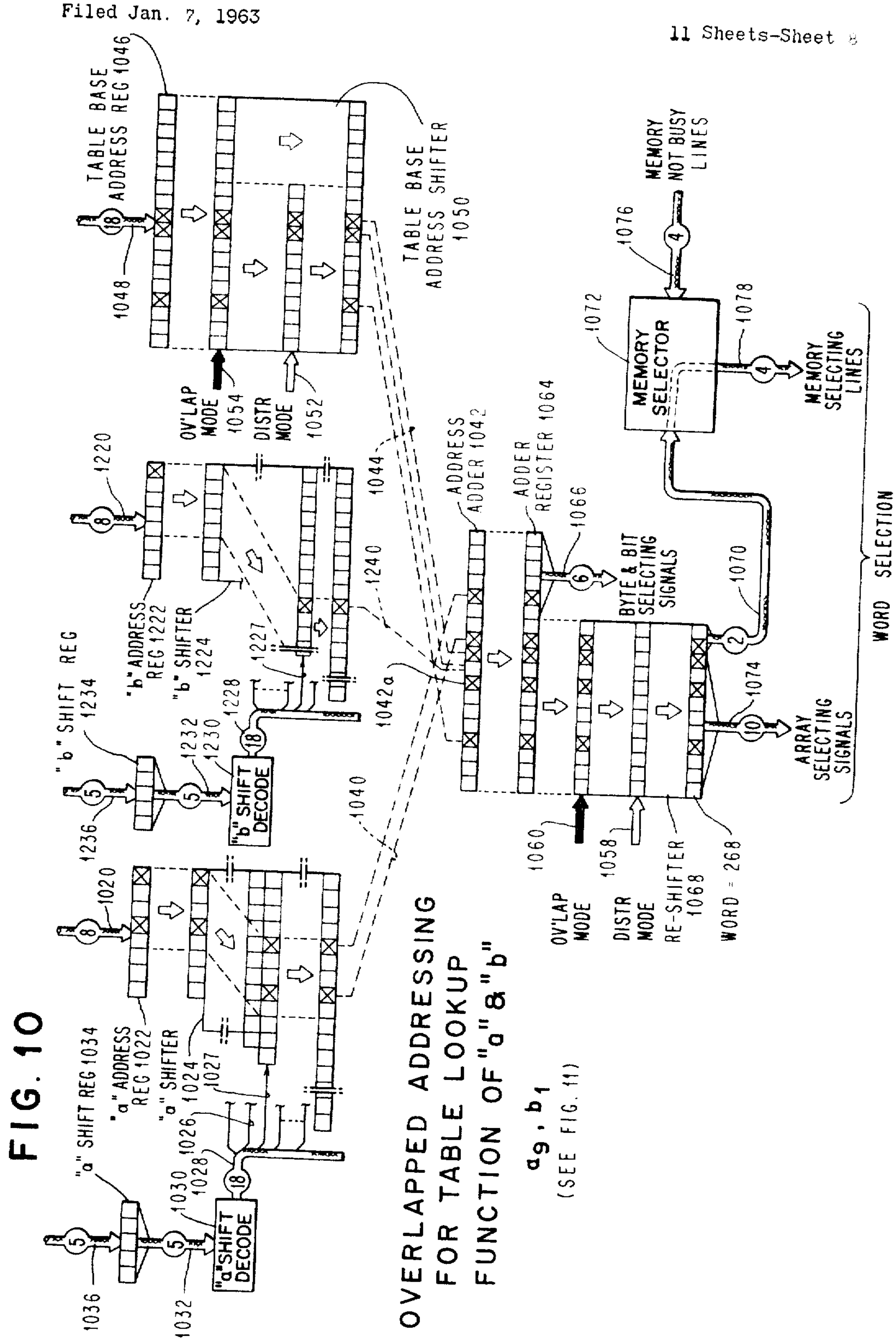
FIG. 10 is a simplified schematic block diagram of the apparatus shown in FIG. 1 with notation applied to illustrate overlapped addressing for table lookup combinational operations of a function of "*a*" and "*b*"

*Function of "a" and "b" in overlapped mode—FIG. 10, Sheet 7; FIG. 11, Sheet 8*

Referring to FIG. 11, the memory units are shown with a table of some function of "*a*" and "*b*" distributed amongst them. In this case, the values of "*a*" run sequentially through the various memory units. Thus it requires only two words of each of the memory units in order to contain the functions of "*a*" for each value of "*b*" (i.e., "*a*0*b*0" to "*a*21*b*0" requires two words of all four of the memory units). As in the case of the distributed table shown in FIG. 9, there is a certain amount of waste space due to the necessity of incrementing word addresses by amounts which are equal to some even power of two. In this case, to shift from any value of "*b*0" to a like value of "*b*1" requires a shift in array address of eight, which is two to the third power (i.e., from "*a*1*b*0" to "*a*1*b*1" requires a shift from word 268 to word 276, an increment of eight words in the entire memory system). The difference between the notation on FIG. 10 and that of FIG. 8 is exactly the same as the difference between the notation of FIG. 2 from that of FIG. 1. In other words, the only differences are that the TABLE BASE ADDRESS SHIFTER 1050 does not shift the table base address code, the RE-SHIFTER 1068 does not shift the high order output from the ADDER REGISTER 1064, and the MEMORY SELECTOR 1072 responds to the output of the two low order stages of the RE-SHIFTER 1068 on the trunk of two lines 1070 in order to generate a signal on the correct one of the MEMORY SELECTING LINES 1078. Thus with a table base address equal to 268, the value of "*b*1" in the "*b*" ADDRESS REGISTER 1222 adds eight to this address, and the value of "*a*9" in the "*a*" ADDRESS REGISTER 1022 adds two more to this address. It is to be noted that the lowest bit of the "*a*" address code becomes the byte portion of the BYTE AND BIT SELECTING SIGNALS on the trunk of six lines 1066 and does not affect the selection of the proper word in memory to be extracted. The BYTE AND BIT SELECTING SIGNALS are utilized to retrieve the correct data from a word after the word is removed from memory.

Since this is overlapped operation, the output from the two low order stages of the RE-SHIFTER 1068 are a significant part of the word selecting address, in this case designating the fact that a word in MEMORY 2 is to be utilized.

Thus, even with multiple data inputs, systems in accordance with the present invention can readily shift between overlapped and distributed modes of operation without changing the addresses or the code combinations of the input data signals which are to be combined.

*Introduction to "Count" examples*

A further example of an operation which a modern high speed computing system may be required to perform has heretofore been referred to in the art as a "Count" operation. This form of operation is fully disclosed in copending application Serial No. 129,687. An example of a "Count" operation given in the aforementioned application Serial No. 129,687 is a payroll registration of applications for company health insurance. For instance, if a certain company has a number of employees, and each employee has a four digit serial number higher than 1000 (although not all numbers need necessarily be assigned), the payroll department may wish to keep track of how many times any member of an employe-family has utilized the hospitalization insurance. In order to accomplish this, each employee may have assigned to him, or more specifically, to his employee number, one block in memory to keep track of the utilization of medical insurance by himself or his family. Thereafter, whenever any member of his family takes advantage of medical insurance, the computer increments the value stored in his storage area. This is achieved in the aforementioned copending application Serial No. 129,687 by means of a count-in-memory system, wherein simple incrementing and other operations may be performed by auxiliary equipment located within the memory. The memory system disclosed in FIG. 5 of this application does not include all of that apparatus. However, it will readily be apparent to any one skilled in the art that such a memory system is completely compatible with the disclosure herein. However, it should be noted that in the aforementioned copending application Serial No. 129,687, the word format is inverse to that used herein: that is, in this application, the highest ordered byte is called BYTE 0, etc., whereas in the aforementioned copending application, the lowest ordered byte is called BYTE 0.

Thus, in the instant invention, a count operation must be performable by utilizing the employee's serial number as an address in order to increment the storage location allocated to him. This must be capable of being effected whether the system is being operated in the distributed mode or in the overlapped mode. The next two sections illustrate this type of operation in both the distributed and overlapped mode of operation.

In these illustrations, it is further assumed that each employee is limited to thirty-two applications per year. For this reason, it is necessary to recognize when this amount has been exceeded. In order to do this, it is possible to limit the number of bit positions in each storage area so that when the thirty-second entry is registered, it will cause an overflow out of the storage area to signal the fact that the limit has been reached. One way in which this can be accomplished is to utilize only the five highest ordered bit positions of an eight-bit storage area. Therefore, upon counting to two to the fifth power, each of the stages will be reset to zero with a carry out of the storage area. Limiting of the size of the storage area can be achieved by causing the base address to not only specify which word the table (or area of storage) begins, but also at which bit of the word it begins. Since the six low ordered positions of the table base address code are not shifted, this bit significance will be maintained, and will cause any combination of "*a*" and "*b*" addresses to specify that same bit position. The bit position referred to will therefore be the low ordered bit position of the storage area, and incrementing it by one will be equivalent to incrementing the amount stored in each employee's storage block by one.

Figure 12:
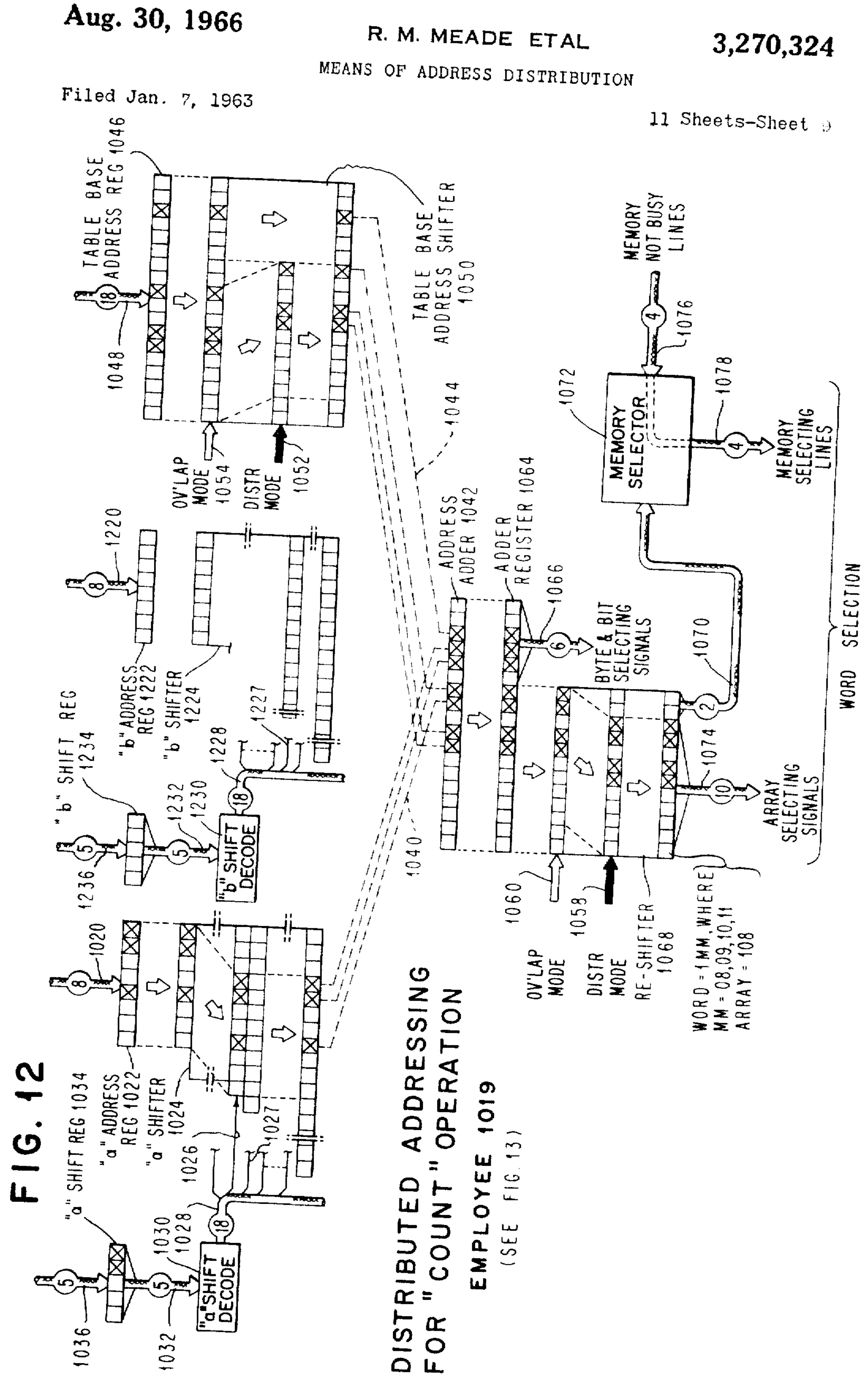
FIG. 12 is a simplified schematic block diagram of the apparatus shown in FIG. 1 with notation applied to illustrate distributed addressing for a count operation.

*Count operation in distributed mode.—FIG. 12 Sheet 9; FIG. 13, Sheet 11*

FIG. 12 illustrates again the hardware of FIGS. 1 and 2 with, however, notation applied to indicate an exemplary count operation. It should be noted that the addressing for the count operation is exactly the same as that for a table lookup operation which was described with reference to FIG. 1. In the table lookup operation of FIG. 1, the contents of each of the memory units, MEMORY 0 through MEMORY 3, was the same in the decoding table portions which were illustrated in FIG. 3, whereas in the count operation shown in FIGS. 12 and 13, any particular memory block may have a different data content than the corresponding block in one of the other memory units. Additionally, no new data is stored in the decoding table portion of the memory during table lookup operations, but in a count operation, the data in any or all of the memory blocks may change, and may change by amounts that differ from the change in corresponding blocks in other memory units.

In FIGS. 12 and 13, the example contemplates the use of an eight bit memory block in the count operation; in the aforementioned copending application Serial No. 129,687, this has been called a "count 8" operation. Thus the "*a*" SHIFT REGISTER 1034 is storing, in binary form, a value of three which will cause the "*a*" SHIFT DECODE 1030 to energize the three column shift line 1026. Therefore, the "*a*" SHIFTER 1024 will shift the employee number stored in the "*a*" ADDRESS REGISTER 1022 three columns to the left.

Referring to FIG. 13, the table base address can be seen to be word 100. This value is stored in the TABLE BASE ADDRESS REGISTER 1046 (FIG. 12) by storing in bit positions which are, disregarding the six low order bit positions, the third, sixth and seventh bit positions following the sixth low order bit positions. These bits equal powers of two such as will indicate decimal values of four, thirty-two and sixty-four, respectively. Thus, this value is equal to the lowest word in the count area of memory: word 100.

As before, the distributed mode of operation causes the TABLE BASE ADDRESS SHIFTER 1050 to shift the table base address code two columns to the right. The output of the TABLE BASE ADDRESS SHIFTER 1050 is added to the output of the "*a*" SHIFTER 1024 in the ADDRESS ADDER 1042. The result of the addition, which is found in the ADDER REGISTER 1064, is split up; the sixth lower ordered bits thereof represent BYTE AND BIT SELECTING SIGNALS on the trunk of six lines 1066; the remaining, high order bits in the ADDER REGISTER 1064 are applied to the RE-SHIFTER 1068 and are shifted two columns to the left. The resulting output of the RE-SHIFTER 1068 is a word address of 1MM, where MM equals 08, 09, 10 or 11. This corresponds to an array address of 108. The "*a*" address code which specifies the employee's number has incremented the table base address code by sufficient number of words so as to address the words in memory wherein the employee number 1019 is found. Thus, counting into the block of memory allocated to employee 1019 may occur in WORD 108, WORD 109, WORD 110 or WORD 111. The selection of which word will be utilized at any given time is under control of the MEMORY SELECTOR 1072, which will select the lowest numbered memory that is available for use.

When counting operations are completed, such as at the end of a calendar year, the results of all the counting may be obtained by adding the various words together. In three add cycles, a total of eight memory blocks may be totaled. This is accomplished by adding, for instance, WORD 108 to WORD 109, adding the result to WORD 110, and adding the second result to the content of WORD 111. This of course will supply totals for all of the employees numbered 1016 to 1023. Furthermore, the fact that these have to be totaled at the end of an accounting period is not very significant in comparison with the fact that regular (such as weekly) on-line computations may be done at the utmost speed; achieving the final total can be done during a slack period without interrupting the normal payroll accounting procedures.

Having described distributed addressing for a count operation, it should be apparent that there is nothing new or startling in the addressing required for the count operation. In other words, the addressing used herein in accordance with the present invention is not limited in its usefulness to certain types of operations, but is adaptable to any regular computer application. It should be noted that in the count example, the base address was not necessarily a table base address, but merely a basic address for an assigned area of memory. The term "table base address" was used in order to more easily introduce the invention with respect to the table lookup application which was chosen as being most comprehensible.

Figure 14:
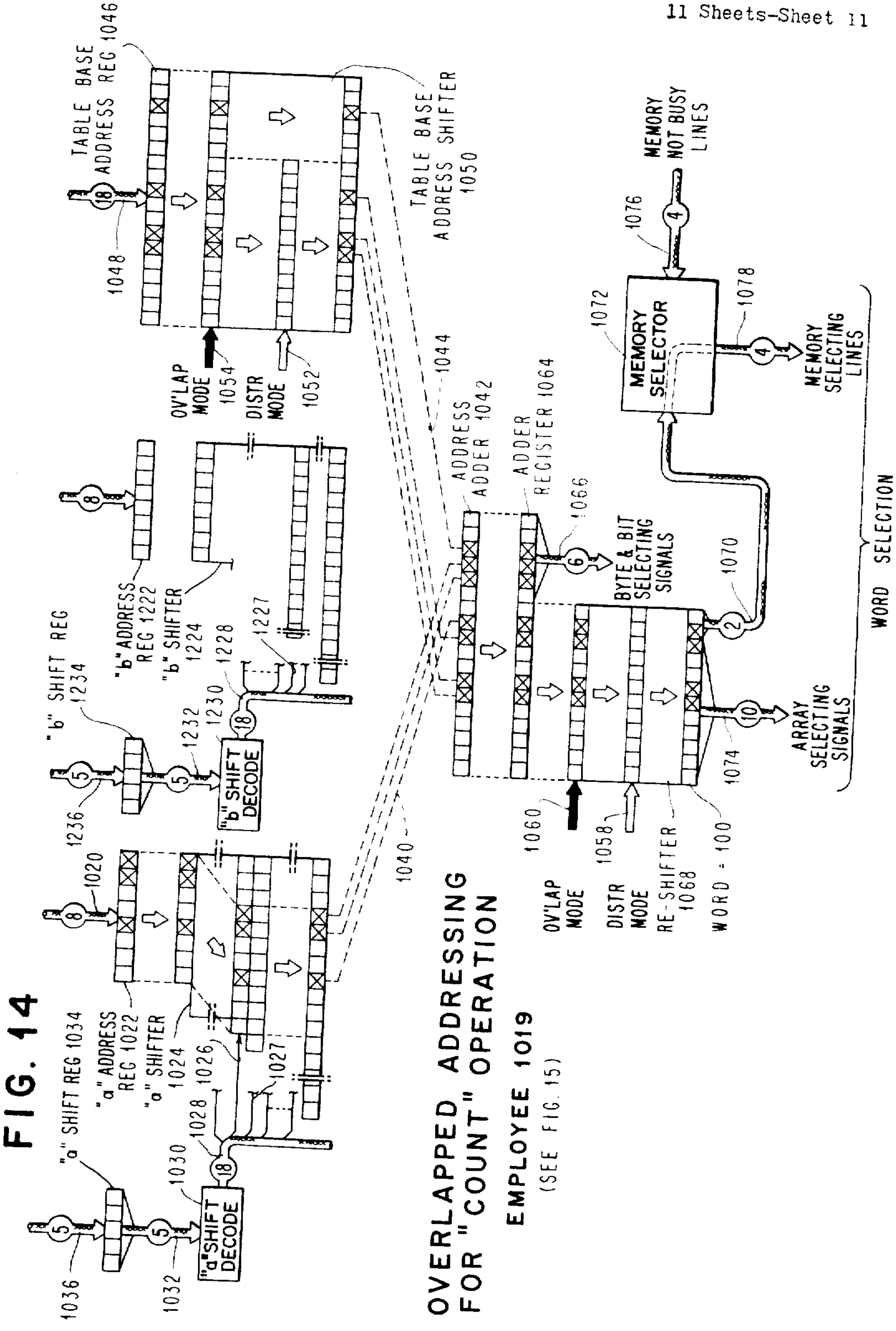
FIG. 14 is a simplified schematic block diagram of the apparatus shown in FIG. 1 with notation applied to illustrate overlapped addressing for a count operation.

*Count operation in overlapped mode—FIG. 14, sheet 10; FIG. 15, sheet 11*

For illustration only, FIGS. 14 and 15 present the overlapped mode of count addressing for counting into the area of employee 1019, as shown in distributed mode in FIGS. 12 and 13. Notice that, in FIG. 15, employee 1019 appears in MEMORY 2: The output of the two lowest ordered stages of the RE-SHIFTER 1068 on the trunk of two lines 1070 specifies the binary code for the decimal value two which thereby causes the MEMORY SELECTOR 1072 to select MEMORY 2. In all other respects, FIG. 14 is a change merely in the TABLE BASE ADDRESS SHIFTER 1050 and the RE-SHIFTER 1068 from the example shown in FIG. 12. Since this has been discussed fully hereinbefore, it is believed that further discussion of this example is unnecessary.

While the invention has been shown and described with respect to a specific embodiment thereof, it should be understood by those skilled in the art that various changes in form and details may be made therein without departing from the spirit and scope of the invention.

What is claimed is:

1. In a computer, a memory address distribution means, comprising:

first address registering means for providing a designation of a selected area of a memory;

second address registering means for providing a designation of a selected portion of said area;

means for dividing said area designation by an even power of two and for providing a resultant new designation;

means for numerically adding said portion designation and said new designation and for providing a resultant total designation;

and means for multiplying said resultant total designation by said even power of two, whereby said total designation equals a final address which includes a multiplied portion component and an effectively unmultiplied area component due to the effect of first, dividing only said area component, combined with the effect of multiplying said total designation.

2. In a computer system of the type having a plurality of memory units, each memory unit capable of storing a plurality of words, each word containing a plurality of bytes, each byte containing a plurality of bits, any bit in any one of the memory units being addressable by an ordered sequence of signals in a combinational form, the highest ordered signals in said form designating bytes, the next highest ordered signals in said form designating memory units, the next lowest ordered signals in said form corresponding to bytes, and the lowest ordered signals in said form corresponding to bits, a device for addressing said addressing locations in said memory units, comprising:

a first shifting means having three paths therein, a first path corresponding to memory and word portions of said form and capable of shifting signals of said portions a plurality of stages in such a fashion as to cause said signals to be of lower significance in said sequence after shifting than before, a second one of said paths corresponding to the word and memory portion of said form, and capable of transmitting signals of said portions without shifting, and a third one of said paths corresponding to byte and bit portions of said form;

a second shifting means having two paths corresponding to the memory and word portions of said form, a first one of said paths capable of shifting said signals a plurality of stages in such a fashion as to give said signals higher ordered significance in said sequence after shifting than before shifting, and a second one of said paths capable of passing said signals without shifting;

first control means effective when operated to cause said first and second shifting means to utilize their respective first paths;

and second control means effective when operated to cause said first and second shifting means to use their respective second paths.

3. The device described in claim 2 additionally comprising:

memory not-busy means responsive to said memory units to designate an idle condition in at least one of said memory units;

memory selecting means responsive to said control means and capable of assuming either one of two conditions, alternatively, said memory selecting means being operable in a first one of said conditions to select a memory unit in response to said memory not-busy means and being operable in the second one of said conditions to select a memory unit in response to the memory portion of said form, said memory selecting means being in said first condition in response to operation of said first control means and in said second condition in response to operation of said second control means.

4. In a data processing system of the type having a determinable cycle time, a memory apparatus, comprising:

a plurality of storage units, each having a cycle time which is something less than $n$ times the length of said determinable cycle time, where $n$ is equal to the number of storage units in said plurality, each storage unit having a plurality of storage locations, each location having an address, each address in any one of said storage units corresponding to a like address in each other one of said storage units, locations having like addresses comprising a "set";

writing means for storing a manifestation representing an item of data in each of said storage units, said writing means storing each data manifestation in each location of a set;

read address designating means for providing a location address manifestation indicative of the location set which contains manifestations of a stored item of data to be retrieved, thereby designating a selected set of locations;

a plurality of unit ready means, one for each of said units, each for designating the fact that the corresponding unit is ready for use by generating a ready manifestation;

unit control means responsive to said plurality of unit ready means for generating a unit address manifestation of a one of said units for which the related ready means has provided a ready manifestation, thereby designating a selected one of said units;

and reading means responsive to said address designating means and to said unit control means for retrieving from said selected set of locations manifestations of an item of data stored in said selected unit.

5. The device described in claim 4 wherein said read address designating means also provides a unit address manifestation indicative of the unit containing a particular one of said selected set of locations;

and wherein said reading means is settable to respond to the unit address manifestation from either said unit control means or said read address designating means, alternatively.

6. In a data processing system of the type having a determinable cycle time, a memory apparatus, comprising:

a plurality of storage units, each having a cycle time which is something less than $n$ times the length of said determinable cycle time, where $n$ is equal to the number of storage units in said plurality, each storage unit having a plurality of storage locations, each location having a word address, each word address in any one of said storage units corresponding to a like word address in each other one of said storage units, locations having corresponding word addresses comprising an "array";

address designating means for providing a location word address manifestation indicative of the array into which manifestations of an item of data are to be stored or which contains manifestations of a stored item of data to be retrieved, thereby designating a selected array of word locations;

memory unit allocation means for generating successive, different memory unit address manifestations for said units, thereby repetitively designating a particular different one of said units which is available for use;

and memory selection means responsive to said memory unit allocation means for selecting a specific one of said units, thereby designating a specific one of the plurality of locations included in the array designated by the manifestation from said address designating means.

7. The device described in claim 6 wherein:

said address designating means also provides a unit address manifestation indicative of the unit containing a particular location in said selected array;

and wherein said memory selection means is settable to respond to a unit address manifestation from either said memory unit allocation means or said address designating means, alternatively.

8. In a computer system of the type having a plurality of memory units, each memory unit capable of storing a plurality of words, each word containing a plurality of bytes, each byte containing a plurality of bits, any bit in any one of the memory units being addressable by an ordered sequence of signals in a combinational form, the highest ordered signals in said form designating bytes, the next highest ordered signals in said form designating memory units, the next lowest ordered signals in said form corresponding to bytes, and the lowest ordered signals in said form, corresponding to bits, a device for addressing said addressing locations in said memory units, comprising:

a shifting means having two paths corresponding to the memory and word portions of said form, a first one of the said paths capable of shifting said signals a plurality of stages in such a fashion as to give said signals higher ordered significance in said sequence after shifting than before shifting, and a first one of said paths capable of passing said signals without shifting;

and control means for selectively operating said first path or said second path, alternatively.

9. The device described in claim 8 additionally comprising:

memory not-busy means responsive to said memory units to designate an idle condition in at least one of said memory units;

memory selecting means responsive to said control means and capable of assuming either one of two conditions, alternatively, said memory selecting means being operable in a first one of said conditions to select a memory unit in response to said memory not-busy means, and being operable in the second one of said conditions to select a memory unit in response to the memory position of said form, said memory selecting means being in said first condition in response to operation of said control means so as to select said first path and being in said second condition in response to operation of said control means so as to select said second path.

10. In a computer system of the type having a plurality of memory units, each memory unit capable of storing a plurality of words, each word containing a plurality of bytes, each byte containing a plurality of bits, any bit in any one of the memory units being addressable by an ordered sequence of signals in a combinational form, the highest ordered signals in said form designating bytes, the next highest ordered signals in said form designating memory units, the next lowest ordered signals in said form corresponding to bytes, and the lowest ordered signals in said form corresponding to bits, a device for addressing said addressing locations in said memory units, comprising:

a first shifting means having three paths therein, a first path corresponding to memory and word portions of said form and capable of shifting signals of said portions a plurality of stages in such a fashion as to cause said signals to be of lower significance in said sequence after shifting than before, a second one of said paths corresponding to the word and memory portion of said form, and capable of transmitting signals of said portions without shifting, and a third one of said paths corresponding to byte and bit portions of said form;

a second shifting means having two paths corresponding to the memory and word portions of said form, a first one of said paths capable of shifting said signals a plurality of stages in such a fashion as to give said signals higher ordered significance in said sequence after shifting than before shifting, and a first one of said paths capable of passing said signals without shifting; and control means for selectively operating said first paths or said second paths, alternatively.

11. The device described in claim 10 additionally comprising:

memory not-busy means responsive to said memory units to designate an idle condition in at least one of said memory units;

memory selecting means responsive to said control means and capable of assuming either one of two conditions, alternatively, said memory selecting means being operable in a first one of said conditions to select a memory unit in response to said memory-not-busy means, and being operable in the second one of said conditions to select a memory unit in response to the memory position of said form, said memory selecting means being in said first condition in response to operation of said control means so as to select said first paths and in said second condition in response to operation of said control means so as to select said second paths.

No references cited.

ROBERT C. BAILEY, *Primary Examiner.*

G. D. SHAW, *Assistant Examiner.*